(12) United States Patent
Machida et al.

(10) Patent No.: US 8,546,481 B2
(45) Date of Patent: Oct. 1, 2013

(54) AQUEOUS DISPERSION CONTAINING POLYOLEFIN GRAFT COPOLYMER

(75) Inventors: Shuji Machida, Chiba (JP); Takenori Fujimura, Chiba (JP); Ryo Aburatani, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 271 days.

(21) Appl. No.: 12/865,337

(22) PCT Filed: Jan. 27, 2009

(86) PCT No.: PCT/JP2009/051242
§ 371 (c)(1),
(2), (4) Date: Nov. 22, 2010

(87) PCT Pub. No.: WO2009/096375
PCT Pub. Date: Aug. 6, 2009

(65) Prior Publication Data
US 2011/0104503 A1    May 5, 2011

(30) Foreign Application Priority Data
Jan. 30, 2008    (JP) ................. 2008-019326

(51) Int. Cl.
C08L 51/06    (2006.01)
C08G 63/91    (2006.01)
C08F 4/00    (2006.01)
C08F 293/00    (2006.01)

(52) U.S. Cl.
USPC ............. 524/547; 525/72; 525/244; 525/245; 525/246; 525/254; 525/260; 525/263; 525/268; 525/301

(58) Field of Classification Search
USPC ................. 524/547; 525/244–246, 254, 260, 525/263, 268
See application file for complete search history.

(56) References Cited

U.S. PATENT DOCUMENTS

| | | | |
|---|---|---|---|
| 6,166,118 A | 12/2000 | Hyche et al. | |
| 7,459,503 B2 * | 12/2008 | Kanamaru et al. | 525/386 |
| 2005/0171295 A1 | 8/2005 | Kanamaru et al. | |
| 2006/0106151 A1 | 5/2006 | Sakamoto | |
| 2007/0191547 A1* | 8/2007 | Sekiguchi | 525/242 |
| 2008/0167421 A1* | 7/2008 | Yalvac et al. | 524/570 |

FOREIGN PATENT DOCUMENTS

| | | |
|---|---|---|
| JP | 54 20057 | 2/1979 |
| JP | 6 107442 | 4/1994 |
| JP | 2004 2842 | 1/2004 |
| JP | 2005 126615 | 5/2005 |
| JP | 2006 241623 | 9/2006 |
| JP | 2007 39645 | 2/2007 |
| WO | 03 087172 | 10/2003 |
| WO | WO 03087172 A1 * | 10/2003 |
| WO | 2005 082963 | 9/2005 |
| WO | 2007 088737 | 8/2007 |
| WO | 2007 091478 | 8/2007 |
| WO | WO 2007091478 A1 * | 8/2007 |
| WO | 2008 066168 | 6/2008 |

OTHER PUBLICATIONS

U.S. Appl. No. 12/812,521, filed Jul. 12, 2010, Nomura, et al.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

An aqueous dispersion containing a graft copolymer satisfying (a) to (e) and water: (a) a graft rate is 1 to 150% by mass, (b) a weight average molecular weight is 500 to 400000, (c) a molecular weight distribution is 1.5 to 4, (d) a main chain containing a monomer unit having a hydrophilic group and (e) an α-olefin homopolymerization or α-olefin/ethylene copolymerization side chain, wherein a mesopentad ratio [mmmm] of the polymerization chain is 30 to 80 mole %.

15 Claims, No Drawings

AQUEOUS DISPERSION CONTAINING POLYOLEFIN GRAFT COPOLYMER

BACKGROUND OF THE INVENTION

The present invention relates to an aqueous dispersion, more specifically to an aqueous dispersion containing a specific polyolefin base graft copolymer.

RELATED ART

Polyolefins such as propylene base resins and the like have various excellent performances and therefore are widely used in industrial parts and the like. Usually, in molded articles comprising polyolefins, surfaces thereof are coated or other resin layers are formed thereon, whereby a design property and a value added thereof are enhanced. In general, however, polyolefins do not have a polar group in a molecule, and therefore they are short of a polarity and have the defect that an adhesive property thereof with coating films and other resin layers is low.

Methods in which surfaces of molded articles are chemically treated or subjected to oxidation treatment by using means such as corona discharge treatment, plasma treatment, flame treatment and the like to improve a coating property and an adhesive performance have been tried in order to improve the defects described above regarding polyolefins. In the above methods, however, not only specific equipments are required, but also an effect for improving the coating property and the adhesive performance is not necessarily satisfactory, and in general, a method in which a coating property and an adhesive performance are improved by treating a surface of a molded article with a primer and the like has so far been used. However, organic solvents are used in conventional primers and coating materials in many cases, and problems have been involved therein in terms of an environment and a safety. Accordingly, an organic solvent system is required to be changed to an aqueous system in primers and coating materials, and it is important to develop aqueous dispersions.

Under the background described above, the following techniques on aqueous dispersions have so far been known.

An aqueous dispersion composition prepared by dispersing a homogeneous kneaded matter comprising crystalline polypropylene, a dispersant and water in water is disclosed in, for example, a patent document 1. An emulsion containing high molecular weight polyolefin modified with an acid group, fatty acid, a base, a surfactant and water is disclosed in a patent document 2. A production method for an emulsion of specific polyolefin characterized by using a styrene-maleic anhydride copolymer and the like as a high polymer dispersant is disclosed in a patent document 3. A binder for inorganic fibers comprising an aqueous dispersion containing a polypropylene base resin modified with unsaturated dicarboxylic acids or a salt thereof as an essential component is disclosed in a patent document 4. An aqueous dispersion containing an acid-modified polyolefin base resin having specific properties is disclosed in a patent document 5. Aqueous dispersions containing a polypropylene base polymer having a specific stereoregularity or a modified polypropylene base polymer are disclosed in patent documents 7 and 8.

As described above, various techniques on aqueous dispersions have so far been developed, but considering an increase in performances required to aqueous dispersions in recent years, the situation is that the performances are required to be further enhanced. In particular, it is important that aqueous dispersions are excellent not only in performances on an aqueous dispersion such as a stability, a dispersibility and the like but also performances in various uses such as coating materials, adhesives and the like.

Patent document 1: Japanese Patent Application Laid-Open No. 20057/1979
Patent document 2: U.S. Pat. No. 6,166,118
Patent document 3: International Publication 04/074353
Patent document 4: Japanese Patent Application Laid-Open No. 107442/1994
Patent document 5: Japanese Patent Application Laid-Open No. 241623/2006
Patent document 6: Japanese Patent Application Laid-Open No. 39645/2007
Patent document 7: Japanese Patent Application Laid-Open No. 2842/2004
Patent document 8: Japanese Patent Application Laid-Open No. 126615/2005

DISCLOSURE OF THE INVENTION

The present invention has been made under the above situation, and an object thereof is to develop a graft copolymer which shows an excellent water dispersibility even in a state of reducing a surfactant and which is excellent in an affinity with a binder resin, a pigment and the like and satisfies performances required in coating materials, adhesives and the like and provide an aqueous dispersion containing the above graft copolymer.

Intensive investigations repeated by the present inventors have resulted in finding that a graft copolymer in which a main chain is a polymerization chain containing a monomer unit having a hydrophilic group and in which a side chain is a specific polyolefin chain is characterized by that it has a sufficiently long polyolefin chain and therefore has a high affinity with polyolefin which is a base material and the like and that it has a large content of a hydrophilic group and therefore has a high affinity with a polar material, and thus they have found that the object is achieved by an aqueous dispersion containing the above graft copolymer and water. The present invention has been completed based on the above knowledge. That is, the present invention provides the following aqueous dispersion.

(1) An aqueous dispersion containing a graft copolymer satisfying (a) to (e) shown below and water:
(a) a graft rate is 1 to 150% by mass,
(b) a weight average molecular weight measured by GPC is 500 to 400000,
(c) a molecular weight distribution (Mw/Mn) is 1.5 to 4,
(d) a main chain is a polymerization chain containing a monomer unit having a hydrophilic group and
(e) a side chain is a homopolymerization chain of a single kind or a copolymerization chain of two or more kinds selected from α-olefins having 3 to 28 carbon atoms or a copolymerization chain comprising an α-olefin unit having 3 to 28 carbon atoms and an ethylene unit which accounts for 50% by mass or less, wherein a mesopentad ratio [mmmm] of the polymerization chain is 30 to 80 mole %.

(2) The aqueous dispersion according to the above item (1), wherein the graft copolymer is formed by copolymerization reaction of a reactive polyolefin satisfying (A) to (C) shown below with the monomer forming the main chain of the graft copolymer:
(A) an amount of an end unsaturated group per molecule is 0.5 to 1.0 group,
(B) a mesopentad ratio [mmmm] is 30 to 80 mole % and
(C) a homopolymer of a single kind or a copolymer of two or more kinds selected from α-olefins having 3 to 28 carbon atoms or a copolymer comprising α-olefin having 3 to 28 carbon atoms and ethylene which accounts for 50% by mass or less.

(3) The aqueous dispersion according to the above item (2), wherein the reactive polyolefin is produced under the presence of a metallocene catalyst.

(4) The aqueous dispersion according to the above item (3), wherein the metallocene catalyst is a di-cross-linked complex represented by Formula (I):

[Ka 1]

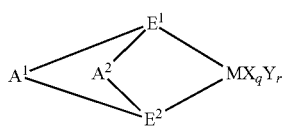

(I)

(wherein M represents a metal element of a 3rd to 10th group in the periodic table; $E^1$ and $E^2$ each represent a ligand selected from a cyclopentadienyl group, a substituted cyclopentadienyl group, an indenyl group, a substituted indenyl group, a heterocyclopentadienyl group, a substituted heterocyclopentadienyl group, an amide group, a phosphine group, a hydrocarbon group and a silicon-containing group, and they form a cross-linking structure via $A^1$ and $A^2$; $E^1$ and $E^2$ may be the same as or different from each other, and at least one of $E^1$ and $E^2$ is a cyclopentadienyl group, a substituted cyclopentadienyl group, an indenyl group or a substituted indenyl group; X represents a σ-bonding ligand, and when a plurality of X is present, plural X may be the same or different and may be cross-linked with other X, $E^1$, $E^2$ or Y; Y represents a Lewis base, and when a plurality of Y is present, plural Y may be the same or different and may be cross-linked with other Y, $E^1$, $E^2$ or X; $A^1$ and $A^2$ are divalent cross-linking groups which bond two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, and $R^1$ represents a hydrogen atom, a halogen atom, a hydrocarbon group having 1 to 20 carbon atoms or a halogen-containing hydrocarbon group having 1 to 20 carbon atoms, and they may be the same as or different from each other; q is an integer of 1 to 5 and represents [(valence of M)−2], and r represents an integer of 0 to 3).

(5) The aqueous dispersion according to the above item (1), wherein the hydrophilic group is a substituent selected from an acid anhydride residue, a carboxyl group, a hydroxyl group, an amide group, an amino group, a pyridyl group and a group having a polyalkylene glycol structure.

(6) The aqueous dispersion according to the above item (1), wherein the monomer unit having a hydrophilic group in a main chain of the graft copolymer originates in at least one monomer selected from [I] acrylic acid and derivatives thereof, [II] methacrylic acid and derivatives thereof and [III] vinyl esters and derivatives thereof.

(7) The aqueous dispersion according to the above item (1), wherein the monomer unit having a hydrophilic group in the main chain of the graft copolymer originates in at least one monomer selected from the following A group and at least one monomer selected from the following B group:

A group: [V] maleic anhydride and substitution products thereof, [VI] maleic acid and esters thereof and [VII] maleimide and substitution products thereof and B group: [I] acrylic acid and derivatives thereof, [II] methacrylic acid and derivatives thereof and [III] vinyl esters and derivatives thereof.

(8) A coating agent, a coating material, an ink or an adhesive comprising the aqueous dispersion according to the above item (1).

(9) A laminated matter having a resin layer formed by coating the aqueous dispersion according to the above item (1) on a base material.

(10) The laminated matter according to the above item (9), wherein the base material is any of a resin, metal, ceramics, wood and glass.

(11) The laminated matter according to the above item (9), wherein the base material is any of crystalline polypropylene, crystalline block polypropylene and a crystalline propylene random copolymer.

According to the present invention, obtained are a graft copolymer in which a main chain is a polymerization chain containing a monomer unit having a hydrophilic group, in which a side chain is a specific polyolefin chain and which has a sufficiently long polyolefin chain and a large hydrophilic group content and an aqueous dispersion containing the above graft copolymer and water. The above graft copolymer has a small diameter of dispersed particles and a high storage stability. Also, it has a sufficiently high water dispersibility even if an amount of a surfactant is reduced, and therefore the performances thereof can be prevented from being reduced in adhesives, coating materials and the like. Further, a binder resin, a pigment and a filler can be improved in a dispersibility, and the coating performances (the adhesive strength, the appearance, the flatness, the uneven color and the like) can be enhanced when polypropylene and the like are used for the base material.

BEST MODE FOR CARRYING OUT THE INVENTION

The aqueous dispersion of the present invention is an aqueous dispersion containing the graft copolymer in which a main chain is a polymerization chain containing a monomer unit having a hydrophilic group and in which a side chain is a specific polyolefin chain and water. The graft copolymer described above is obtained by carrying out graft copolymerization using a specific reactive olefin.

In the present specification, "the reactive polyolefin" shows a polyolefin which forms efficiently a graft copolymer by virtue of a radical initiator, and to be specific, it shows a polyolefin having 0.5 end unsaturated group or more per molecule.

Also, as can be found from the above definition, all molecules contained in the reactive polyolefin do not necessarily have an end unsaturated group and do not always have a reactivity. This allows unreacted polyolefin to be present in a certain case in finishing the copolymerization reaction, but an amount of the unreacted polyolefin can be reduced by controlling an amount of the end unsaturated groups or by a refining step. Accordingly, in the present specification, a reaction product in the copolymerization reaction is not referred to as "the composition", and it is described as "the graft copolymer".

Graft Copolymer:

A main chain of the graft copolymer comprises a monomer unit having a hydrophilic group. The hydrophilic group includes an acid anhydride residue, a carboxyl group (in the present specification, "the carboxyl group" includes a carboxylic acid ion subjected to deprotonation), a hydroxyl group, an amide group, an amino group, a pyridyl group and a group having a polyalkylene glycol structure.

An amount of the monomer unit having a hydrophilic group to a whole amount of the monomer unit contained in the main chain is preferably 40 mol % or more, more preferably 50 mol % or more. If it is 40 mol % or more, the water dispersibility is enhanced, and when the aqueous dispersion is used as a component for an adhesive and a coating material, an affinity thereof to polar materials is enhanced.

The side chain of the graft copolymer is a homopolymerization chain of a single kind or a copolymerization chain of two or more kinds selected from α-olefins having 3 to 28 carbon atoms or a copolymerization chain comprising an α-olefin unit having 3 to 28 carbon atoms and an ethylene unit which accounts for 50% by mass or less.

The α-olefin having 3 to 28 carbon atoms includes propylene, 1-butene, 1-pentene, 4-methylpentene-1,1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-icocene and the like.

The side chain of the graft copolymer is a polymerization chain having a mesopentad ratio [mmmm] of 30 to 80 mole %. The mesopentad ratio [mmmm] described above is preferably 30 to 75 mole %, more preferably 32 to 70 mole %.

If the mesopentad ratio is less than 30 mole %, the heat resistance and the mechanical properties are reduced, and if it exceeds 80 mole %, the adhesive property and the impact strength of the coating film are reduced. A mesopentad ratio of the side chain in the graft copolymer can be known from a stereoregularity of the reactive polyolefin used in producing it. Also, the stereoregularities of methyl, methine and methylene each originating in the reactive polyolefin of the graft copolymer can be determined by NMR analysis described later. Further, they can be determined as well by thermally decomposing the graft copolymer under nitrogen atmosphere and then obtaining fragments forming the side chain to measure them by NMR.

A graft rate of the graft copolymer is 1 to 150% by mass, preferably 2 to 130% by mass and more preferably 5 to 100% by mass. If the graft rate is less than 1% by mass, the graft copolymer is liable to be reduced in an affinity to polar materials and water and degraded in a water dispersibility, and if it exceeds 150% by mass, the graft copolymer is liable to be reduced in an adhesive strength.

The graft rate of the graft copolymer is measured in the following manner.

The graft rate is calculated in the following manner from a mass (W2) of an insoluble graft copolymer component obtained by dissolving and removing a polymer of the monomer forming the main chain which does not participate in the graft copolymerization reaction and a soluble polymer component by a solvent and a mass (W1) of the reactive polyolefin used as the raw material:

graft rate (% by mass)=$(W2-W1)/W1 \times 100$

The solvent used has to dissolve the homopolymer or the copolymer comprising the monomer forming the main chain under dissolving conditions. Further, the solvent used has to show no solubility to the reactive polyolefin under the same dissolving conditions as described above. Showing no solubility means showing a dissolving amount of 1% by mass or less, and dissolving means that insoluble matters are not observed by visual observation of the solution.

A weight average molecular weight of the graft copolymer is 500 to 400000. A lower limit thereof is preferably 1000, more preferably 2000, further preferably 5000 and most preferably 10000, and an upper limit thereof is preferably 350000, more preferably 300000, further preferably 250000 and most preferably 2000000. If the weight average molecular weight is less than 500, the adhesive property is reduced, and problems are brought about in application thereof to adhesives, coating materials and the like. If it exceeds 400000, the graft copolymer is increased in a melt viscosity and reduced in a flowability, so that problems are brought about in heat fusion such as heat sealing and the like.

A molecular weight distribution (Mw/Mn) of the graft copolymer is 1.5 to 4, preferably 1.55 to 3 and more preferably 1.6 to 2.5. If it is less than 1.5, the melt fluidity is reduced, and if it exceeds 4, sticky components are produced in a certain case.

When a weight average molecular weight and a molecular weight distribution of the graft copolymer are determined, a gel permeation chromatography (GPC) method can be used in the following manner.

The molecular weight distribution (Mw/Mn) can be determined by measuring the weight average molecular weight (Mw) and the number average molecular weight (Mn) by means of the following equipment on the following conditions by the GPC method:

GPC Measuring Equipment:
Detector: RI detector for liquid chromatography, 150C manufactured by Waters Corporation
Column: TOSO GMHHR-H(S) HT
Measuring Conditions:
  Solvent: 1,2,4-trichlorobenzene
  Measuring temperature: 145° C.
  Flow velocity: 1.0 ml/minute
  Sample concentration: 0.3% by mass The weight average molecular weight (Mw) and the number average molecular weight (Mn) were determined by a Universal Calibration method using constants K and a of a Mark-Houwink-Sakurada equation in order to reduce a polystyrene-reduced molecular weight to a molecular weight of the corresponding polymer.

To be specific, they were determined by a method described in "Size Exclusion Chromatography, written by S. Mori, p. 67 to 69, 1992, Kyouritsu Shuppan".

K and α are described in "Polymer Handbook, John Wiley & Sons, Inc.".

Also, they can be determined from a relation of a limiting viscosity to a newly calculated absolute molecular weight by an ordinary method.

The graft copolymer has a limiting viscosity [η] of preferably 0.01 to 2.5 dl/g, more preferably 0.02 to 2.2 dl/g and further preferably 0.05 to 2.0 dl/g which is measured at 135° C. in decalin.

If the limiting viscosity [η] is 0.01 dl/g or more, the performances such as the resin compatibility and the like are elevated, and if it is 2.5 dl/g or less, the dispersibility into resins is enhanced. Accordingly, both are preferred.

Further, the graft copolymer preferably does not contain a gel component. A reduction in the gel component is achieved by using a reactive polyolefin which has a high amount of an end unsaturated group and which does not substantially contain a molecule having unsaturated groups at both ends to efficiently carry out graft copolymerization reaction.

Measuring Method for Gel Component:
A solvent which dissolves both of a main chain component of the graft copolymer and a side chain component thereof is used, and 50 mg of the graft copolymer is put in a cage made of a stainless-made net of 400 mesh (aperture: 0.034 mm) in a glass-made separable flask equipped with a stirring device. The cage is fixed on a stirring blade.

A solvent containing 0.1% by mass of an antioxidant (BHT) is added thereto, and the polymer is dissolved under a boiling point for 4 hours while stirring.

After dissolved, the cage is recovered and dried sufficiently under vacuum, and an insoluble part is determined by weighing.

The gel component defined as the insoluble part is calculated according to the following equation:

((amount (g) remaining in mesh)/(amount (g) of sample charged))×100 (unit: %)

The solvent includes paraxylene, toluene and the like.

Usually, it is prescribed by a range of 0 to 1.5% by mass in the equation described above that the gel component is not contained therein.

Production Method for Graft Copolymer:

The graft copolymer can be produced by polymerizing the specific reactive olefin with the monomer forming the main chain.

Reactive Olefin for Side Chain:

The reactive polyolefin used in the present invention is preferably a reactive polyolefin which is a homopolymer of a single kind or a copolymer of two or more kinds selected from α-olefins having 3 to 28 carbon atoms or a copolymer of at least one monomer selected from α-olefins having 3 to 28 carbon atoms and ethylene which accounts for 50% by mass or less, wherein a mesopentad ratio [mmmm] is 30 to 80 mole %, and an amount of an end unsaturated group per molecule is 0.5 to 1.0 group. The reactive polyolefin used in the present invention can be produced by satisfying the conditions described above.

The mesopentad ratio [mmmm] described above is preferably 30 to 75 mole %, more preferably 32 to 70 mole %.

In a case of the polymer comprising propylene as a principal component, a stereoregularity thereof is determined in the following manner.

The mesopentad ratio [mmmm] described above and a racemipentad ratio [rrrr] and a racemimesoracemimeso ratio [rmrm] each described later are a meso ratio, a racemi ratio and a racemimesoracemimeso ratio in a pentad unit in a polypropylene molecular chain measured by a signal of a methyl group in a $^{13}$C-NMR spectrum according to a method proposed by A. Zambelli et al. in "Macromolecules, 6, 925 (1973)".

If the mesopentad ratio [mmmm] grows larger, the stereoregularity is elevated.

A $^{13}$C-NMR spectrum can be measured on the following conditions by means of the following equipment according to assignment of peaks proposed by A. Zambelli et al. in "Macromolecules, 8, 687 (1975)".

A mesotriad ratio [mm], a racemitriad ratio [rr] and a mesoracemi ratio [mr] each described later are calculated as well according to the method described above.

Apparatus: JNM-EX400 type $^{13}$C-NMR apparatus manufactured by JEOL Ltd.
Method: proton complete decoupling method
Concentration: 220 mg/ml
Solvent: 90:10 (volume ratio) mixed solvent of 1,2,4-trichlorobenzene and heavy benzene
Temperature: 130° C.
Pulse duration: 45°
Pulse repeating time: 4 seconds
Integration: 10000 times <Calculating Equation>

$$M=(m/s)\times 100$$

$$R=(\gamma/s)\times 100$$

$$S=P\beta\beta+P\alpha\beta+P\alpha\gamma$$

S: signal intensity of side chain methyl carbon atom in whole propylene units
Pββ: 19.8 to 22.5 ppm
Pαβ: 18.0 to 17.5 ppm
Pαγ: 17.5 to 17.1 ppm
γ: racemipentad chain: 20.7 to 20.3 ppm
m: mesopentad chain: 21.7 to 22.5 ppm In a case of the polymer comprising polybutene as a principal component, a stereoregularity thereof is determined in the following manner.

The mesopentad ratio (mmmm) and the abnormal insertion content (1,4 insertion ratio) were determined according to methods proposed in "Polymer Journal, 16, 717 (1984)" reported by Asakura et al., "Macromol. Chem. Phys., C29, 201 (1989)" reported by J. Randall et al. and "Macromol. Chem. Phys., 198, 1257 (1997)" reported by V. Busico et al.

That is, signals of a methylene group and a methine group were measured by using a $^{13}$C nuclear magnetic resonance spectrum to determine a mesopentad ratio and an abnormal insertion content in a poly(1-butene) molecule.

The $^{13}$C nuclear magnetic resonance spectrum was measured on the conditions described above by means of the apparatus described above.

The stereoregularity index ((mmmm)/(mmrr+rmmr)) was calculated from a value obtained by measuring (mmmm), (mmrr) and (rmmr) according to the method described above.

Further, the racemitriad ratio (rr) can be calculated as well according to the method described above.

A stereoregularity index ((mmmm)/(mmrr+rmmr)) of the 1-butene homopolymer and the copolymer is 20 or less, preferably 18 or less and more preferably 15 or less.

If the stereoregularity index exceeds 20, the flexibility is reduced.

In a case of the polymer comprising α-olefin having 5 or more carbon atoms as a principal component, a stereoregularity thereof is determined in the following manner.

The above stereoregularity index value $M_2$ was determined according to a method proposed in "Macromolecules, 24, 2334 (1991)" reported by T. Asakura, M. Demura and Y. Nishiyama.

That is, $M_2$ can be determined by making use of that $CH_2$ carbon at an α-position of the side chain which originates in higher α-olefin is observed in a split state reflecting a difference in a stereoregularity in the $^{13}$C-NMR spectrum.

In the present invention, above $M_2$ can be replaced by the mesopentad ratio (mmmm) described above.

It is shown that the higher the above value is, the higher the isotacticity is.

The apparatus and the conditions of the $^{13}$C nuclear magnetic resonance spectrum are the same as described above, and the stereoregularity index value $M_2$ is determined in the following manner.

Large six absorption peaks based on the mixed solvent are observed in 127 to 135 ppm. Among these peaks, a value of the fourth peak from a low magnetic field side is observed in 131.1 ppm, and it is set to a standard for chemical shift.

In the above case, absorption peaks based on $CH_2$ carbon at an α-position of the side chain are observed in the vicinity of 34 to 37 ppm.

In this regard, $M_2$ (mole %) is determined by using the following equation:

$$M_2=((\text{integrated intensity in 36.2 to 35.3 ppm})/(\text{integrated intensity in 36.2 to 34.5 ppm}))\times 100$$

The reactive polyolefin described above has 0.5 to 1.0 group, preferably 0.6 to 1.0 group, more preferably 0.7 to 1.0 group, more preferably 0.8 to 1.0 group, more preferably 0.82 to 1.0 group, further preferably 0.85 to 1.0 group and most preferably 0.90 to 1.0 group of an end unsaturated group per molecule.

If the end unsaturated group is 0.5 or more group, a concentration of the unsaturated group grows high, and a production efficiency of the graft copolymer is elevated.

The end unsaturated group is preferably a vinylidene group, and the vinylidene group accounts for usually 50 to 100 mole %, preferably 60 to 100 mole %, more preferably 70 to 100 mole % and further preferably 80 to 100 mole % based on the end unsaturated group.

The reactive polyolefin used in the present invention does not substantially contain a component having two or more unsaturated groups per molecule, for example, a component having unsaturated groups at both ends.

The component having two or more unsaturated groups per molecule acts as a so-called cross-linking agent, and therefore it forms a cross-linked structure (H type) in the graft polymerization to by-produce a gel component, so that it is not preferred.

Accordingly, unsaturated polypropylene produced by thermal decomposition can not be used.

The unsaturated group described above is measured usually by using an infrared absorption spectral method, a nuclear magnetic resonance spectral method, a bromination method and the like, and it can be measured by any the above methods.

The infrared absorption spectral method can be carried out according to a method described in "New Edition High Polymer Analysis Handbook, edited by Japan Society for Analytical Chemistry, High Polymer Analysis Research Seminar".

According thereto, unsaturated groups such as a vinyl group, a vinylidene group, a trans(vinylene) group and the like can be quantatively determined respectively from absorptions in 910 $cm^{-1}$, 888 $cm^{-1}$ and 963 $cm^{-1}$ of an infrared absorption spectrum in a method for determining an end unsaturated group by the infrared absorption spectral method.

A vinylidene unsaturated group is quantatively determined in the following manner by the nuclear magnetic resonance spectral method.

When the end unsaturated group is a vinylidene group, the number thereof is determined by measurement of $^1$H-NMR according to an ordinary method.

A content (C) (mole %) of the vinylidene group is calculated by an ordinary method based on the vinylidene group appearing in δ4.8 to 4.6 (2H) which is obtained from measurement of $^1$H-NMR.

Further, the number of the vinylidene group per molecule is calculated from the number average molecular weight (Mn) determined by gel permeation chromatography (GPC) and the monomer molecular weight (M) according to the following equation:

end vinylidene group (groups) per molecule=$(Mn/M)\times(C/100)$

Also, an example of a method carried out by the nuclear magnetic resonance spectral method includes a method based on quantitative determination of end groups. To be specific, it is a method in which end groups produced by polymerization reaction and contents thereof are measured by $^1$H-NMR and $^{13}$C-NMR to calculate the number of the end vinylidene groups per molecule from a presence proportion of the end vinylidene groups based on an amount of the whole end groups.

A case of the propylene polymer shall be shown as an example thereof.

Analysis of End Unsaturated Group by $^1$H-NMR:

[2] A methylene group (4.8 to 4.6 ppm) of a vinylidene group and [1] a methylene group (5.10 to 4.90 ppm) of a vinyl group are observed in the propylene polymer. A proportion thereof based on the whole propylene polymer can be calculated according to the following equation. Also, [3] corresponds to peak intensities corresponding to methane, methylene and methyl groups of a propylene chain (0.6 to 2.3 ppm).

Amount (A) of end vinylidene group=$([2]/2)/[([3]+4\times[1]/2+3\times[2]/2)/6]\times100$ (unit: mole %)

Amount (B) of end vinyl group=$([1]/2)/[([3]+4\times[1]/2+3\times[2]/2)/6]\times100$ (unit: mole %)

Analysis of End Ratio by $^{13}$C-NMR:

In the propylene polymer of the present invention, observed are [5] an end methyl group (in the vicinity of 14.5 ppm) at an end of n-propyl, [6] an end methyl group (in the vicinity of 14.0 ppm) at an end of n-butyl, [4] a methine group (in the vicinity of 25.9 ppm) at an end of iso-butyl and [7] a methylene group (in the vicinity of 111.7 ppm) at an end of vinylidene. A peak intensity of the end vinyl group amount measured by $^{13}$C-NMR was calculated in the following manner by using (A) and (B) determined in the $^1$H-NMR spectrum:

peak intensity of the end vinyl group amount in $^{13}$C-NMR=$(B)/(A)\times[7]$ in this regard, a whole concentration (T) of the end group is shown in the following manner:

$T=(B)/(A)\times[7]+[4]+[5]+[6]+[7]$

Accordingly, the proportions of the respective ends are:

(C) end vinylidene group=$[7]/T\times100$ (unit: mole %)

(D) end vinyl group=$(B)/(A)\times[7]\times100$ (E) n-propyl end=$[5]/T\times100$ (F) n-butyl end=$[6]/T\times100$ (G) iso-butyl end=$[4]/T\times100$ The number of the end vinylidene groups per molecule is 2×(C)/100 (unit: group/molecule).

The reactive polyolefin described above has a molecular weight distribution (Mw/Mn) of preferably 4 or less, more preferably 3.5 or less, more preferably 3 or less and further preferably 2.5 or less.

The narrower molecular weight distribution is more preferred. This is because of the reasons that in the graft copolymer used in the present invention, the reactive polyolefin forms chains, so that a side chain length (chain length) is less scattered and that the graft copolymer having a controlled structure is formed. The molecular weight distribution can be measured by making use of the method explained in the production of the graft copolymer described above.

The reactive polyolefin described above has a limiting viscosity [η] of 0.01 to 2.5 dl/g, preferably 0.05 to 2.5 dl/g, more preferably 0.05 to 2.0 dl/g, further preferably 0.1 to 2.0 dl/g and most preferably 0.15 to 1.8 dl/g which is measured at 135° C. in decalin.

If the limiting viscosity [η] falls in the ranges described above, a side chain length (chain length) of the graft copolymer is satisfactory, and the performances such as the compatibility and the like are sufficiently exerted. Further, a concentration of the end unsaturated group is high in the graft copolymerization, and therefore the radical polymerizability is elevated.

The limiting viscosity [η] is calculated by measuring a reduced viscosity ($\eta_{SP}/c$) in decalin of 135° C. by means of a Ubbelohde viscometer and using the following equation (Huggins equation):

$$\eta_{SP}/c=[\eta]+K[\eta]^2 c$$

$\eta_{SP}/c$ (dl/g): reduced viscosity
[η] (dl/g): limiting viscosity
c (g/dl): polymer concentration
K: 0.35 (Huggins constant)

The reactive polyolefin satisfies preferably the following equation:

racemimesoracemimeso ratio [rmrm]>2.5 mole %

If a racemimesoracemimeso ratio [rmrm] of the reactive polyolefin exceeds 2.5 mole %, the random property is increased, and the transparency is further enhanced.

In the reactive polyolefin, a melting point (Tm, unit: ° C.) observed by a differential scanning type colorimeter (DSC) and [mmmm] satisfy preferably the following relation:

$$1.76[mmmm]-25.0 \le Tm \le 1.76[mmmm]+5.0$$

The relational equation described above between the melting point (Tm, unit: ° C.) observed by the differential scanning type colorimeter (DSC) and [mmmm] shows a uniformity of a mesopentad ratio of the reactive polyolefin.

When the reactive polyolefin has a high uniformity of a stereoregularity, that is, when it has a narrow stereoregularity distribution, it shows that the graft copolymer has a high uniformity of a side chain, and a compatibility thereof with a polypropylene base resin and the like is elevated. When the reactive polyolefin having a high mesopentad ratio and the reactive polyolefin having a low mesopentad ratio are present in a mixture and when they are block-combined, that is, when the stereoregularity distribution is broad, a compatibility thereof with a polypropylene base resin and the like is reduced, and it is not preferred. The foregoing [mmmm] is measured in terms of an average value, and a case in which the stereoregularity distribution is broad can not clearly be distinguished from a case in which the stereoregularity distribution is narrow, but the preferred reactive propylene base copolymer having a high uniformity can be prescribed by limiting, as described above, relation of [mmmm] with the melting point (Tm) to a specific range.

When the melting point (Tm) exceeds (1.76[mmmm]+5.0), it shows that the part having a partially high stereoregularity and the part having no stereoregularity are present.

Also, when the melting point (Tm) does not reach (1.76[mmmm]−25.0), the heat resistance is unlikely to be sufficiently high.

From the viewpoint described above, the relational equation is preferably $$1.76[mmmm]-20.0 \le Tm \le 1.76[mmmm]+3.0$$

more preferably $$1.76[mmmm]-15.0 \le Tm \le 1.76[mmmm]+2.0$$

The melting point (Tm) described above is determined by DSC measurement.

A sample 10 mg was heated from 25° C. up to 220° C. at 320° C./minute under nitrogen atmosphere and held at 220° C. for 5 minutes, and then it was cooled down to 25° C. at 320° C./minute and held at 25° C. for 50 minutes. Then, it was heated from 25° C. up to 220° C. at 10° C./minute. A peak top in an endothermic peak observed at a highest temperature side of a melting heat absorbing curve detected in the above heating step was set to the melting point (Tm).

The reactive polyolefin further satisfies preferably the following prescription:

$$[rrrr]/(1-[mmmm]) \le 0.1$$

If the relation described above is satisfied, the stickiness is inhibited.

$$[mm] \times [rr]/[mr]^2 \le 2.0$$

If a value of $[mm] \times [rr]/[mr]^2$ is 2.0 or less, the transparency is inhibited from being reduced, and a balance between the flexibility and the elasticity recovering rate are improved. A value of $[mm] \times [rr]/[mr]^2$ falls in a range of preferably 1.8 to 0.5, more preferably 1.5 to 0.5.

20≤component amount (W25) eluted at 25° C. or lower in a programmed temperature chromatography≤100 (% by mass)

A component amount (W25) of the reactive polyolefin eluted at 25° C. or lower in the programmed temperature chromatography described above falls in a range of preferably 30 to 100% by mass, more preferably 50 to 100% by mass.

W25 is an index showing whether or not the reactive polyolefin is soft. If a value thereof is reduced, a component having a high elastic modulus is increased, and a nonuniformity of the mesopentad ratio (mmmm) is broadened.

In the reactive polyolefin described above, if W25 is 20% by mass or more, the flexibility is maintained.

W25 is an amount (% by mass) of a component eluted without being adsorbed onto a filler at a column temperature of 25° C. in TREF (programmed temperature elution fractionation) in an elution curve measured and determined by programmed temperature chromatography in an apparatus structure shown below on the following measuring conditions by the following operating method.

(1) Operating Method:

The sample solution is introduced into a TREF column controlled at a temperature of 135° C. and then slowly cooled down to 0° C. at a cooling rate of 5° C./hour, and it is held for 30 minutes to crystallize the sample on a filler surface. Then, the column is heated up to 135° C. at a heating rate of 40° C./hour to obtain an elution curve.

(2) Apparatus Structure:
  TREF column: silica gel column (4.6φ×150 mm), manufactured by GL Science Corporation
  Flow cell: optical path length: 1 mm, KBr cell, manufactured by GL Science Corporation
  Liquid delivering pump: SSC-3100 pump, manufactured by Senshu Scientific Co., Ltd.
  Valve oven: MODEL 554 oven (high temperature type), manufactured by GL Science Corporation
  TREF oven: manufactured by GL Science Corporation
  Dual system temperature controlling device: REX-C100 temperature controlling device, manufactured by Rigaku Kogyo Co., Ltd.
  Detector: Infrared detector for liquid chromatography, MIRAN 1A CVF, manufactured by Foxboro Corporation
  Ten-way valve: electric valve, manufactured by Balco Corporation
  Loop: 500 μl loop, manufactured by Balco Corporation (3) Measuring Conditions:
  Solvent: o-dichlorobenzene
  Sample concentration: 7.5 g/L
  Injection amount: 500 μl Pump flow amount: 2.0 ml/minute
Detection wave number: 3.41 μm
Column filler: Chromosolve P (30 to 60 mesh)
Column temperature distribution: ±0.2° C. or lower The reactive polyolefin is produced preferably by using a metallocene catalyst.

The metallocene catalyst includes catalysts which contain (A) a transition metal compound having a cyclopentadienyl group, a substituted cyclopentadienyl group, an indenyl group, a substituted indenyl group and the like and comprising a metal element of a 3rd to 10th group in the periodic table and (B) a compound capable of being reacted with the transition metal compound to form an ionic complex and which can form an end unsaturated group.

The transition metal compound includes compounds comprising a biscyclopentadienyl ligand such as zirconocene chloride, pentamethylcyclopentadienylzirconium dichloride and the like, compounds comprising a cross-linked indenyl ligand such as ethylenebisindenylzirconium dichloride, dimethylsilylene-bis-[2-methyl-4-phenylindenyl]zirconium dichloride, dimethylsilylene-bis-[2-methyl-4,5-benzoindenyl]zirconium dichloride and the like, compounds comprising a monocyclopentadienyl ligand such as pentamethylcyclopentadienyltrimethoxytitanium, pentamethylcyclopentadienyltrichlorotitanium and the like, compounds comprising an azulenium ligand such as dichloro[dimethylsilylene(cyclopentadienyl)(2,4-dimethyl-4H-1-azulenyl)]hafnium, dichloro[dimethylgermylene-(cyclopentadienyl)(2,4-dimethyl-4H-1-azulenyl)]hafnium, dichloro[dimethylsilylene(2-methyl-1-indenyl)(2,4-dimethyl-4H-1-azulenyl)]hafnium and the like.

Further, the transition metal compound includes a double cross-linked transition metal compound represented by the following Formula (I):

[Ka 2]

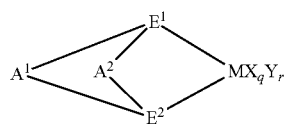

(I)

In Formula (I), M represents a metal element of a 3rd to 10th group in the periodic table, and a specific example thereof includes titanium, zirconium, hafnium, yttrium, vanadium, chromium, manganese, nickel, cobalt, palladium, lanthanoid base metals and the like.

Among them, titanium, zirconium and hafnium are suited from the viewpoint of an olefin polymerization activity, and zirconium is most suited from the viewpoint of a yield of an end vinylidene group and a catalyst activity.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group (>CR—, >C<) and a silicon-containing group (>SiR—, >Si<) (provided that R is a hydrogen, a hydrocarbon group having 1 to 20 carbon atoms or a hetero atom-containing group), and they form a cross-linking structure via $A^1$ and $A^2$. $E^1$ and $E^2$ may be the same as or different from each other.

Above $E^1$ and $E^2$ are preferably a cyclopentadienyl group, a substituted cyclopentadienyl group, an indenyl group and a substituted indenyl group, and at least one of $E^1$ and $E^2$ is a cyclopentadienyl group, a substituted cyclopentadienyl group, an indenyl group or a substituted indenyl group.

X represents a (σ-bonding ligand, and when a plurality of X is present, plural X may be the same or different and may be cross-linked with other X, $E^1$, $E^2$ or Y.

The specific examples of X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, an acyl group having 1 to 20 carbon atoms and the like.

The halogen atom includes a chlorine atom, a fluorine atom, a bromine atom and an iodine atom.

The hydrocarbon group having 1 to 20 carbon atoms includes, to be specific, alkyl groups such as methyl, ethyl, propyl, butyl, hexyl, cyclohexyl, octyl and the like; alkenyl groups such as vinyl, propenyl, cyclohexenyl 1 and the like; arylalkyl groups such as benzyl, phenylethyl, phenylpropyl and the like; aryl groups such as phenyl, tolyl, dimethylphenyl, trimethylphenyl, ethylphenyl, propylphenyl, biphenyl, naphthyl, methylnaphthyl, anthracenyl, phenanthrenyl and the like.

Among them, the alkyl groups such as methyl, ethyl, propyl and the like and the aryl groups such as phenyl and the like are preferred.

The alkoxy group having 1 to 20 carbon atoms includes alkoxy groups such as methoxy, ethoxy, propoxy, butoxy and the like, phenylmethoxy, phenylethoxy and the like.

The aryloxy group having 6 to 20 carbon atoms includes phenoxy, methylphenoxy, dimethylphenoxy and the like.

The amide group having 1 to 20 carbon atoms includes alkylamide groups such as dimethylamide, diethylamide, dipropylamide, dibutylamide, dicyclohexylamide, methylethylamide and the like, alkenylamide groups such as divinylamide, dipropenylamide, dicyclohexenylamide and the like; arylalkylamide groups such as dibenzylamide, phenylethylamide, phenylpropylamide and the like; arylamide groups such as diphenylamide, dinaphthylamide and the like.

The silicon-containing group having 1 to 20 carbon atoms includes hydrocarbon-monosubstituted silyl groups such as methylsilyl, phenylsilyl and the like; hydrocarbon-disubstituted silyl groups such as dimethylsilyl, diphenylsilyl and the like; hydrocarbon-trisubstituted silyl groups such as trimethylsilyl, triethylsilyl, tripropylsilyl, tricyclohexylsilyl, triphenylsilyl, dimethylphenylsilyl, methyldiphenylsilyl, tritoylsilyl, trinaphthylsilyl and the like; hydrocarbon-substituted silyl ether groups such as trimethylsilyl ether and the like; silicon-substituted alkyl groups such as trimethylsilylmethyl and the like; silicon-substituted aryl groups such as trimethylsilylphenyl and the like.

Among them, trimethylsilylmethyl, phenyldimethylsilylethyl and the like are preferred.

The phosphide group having 1 to 20 carbon atoms includes dialkyl phosphide groups such as dimethyl phosphide, diethyl phosphide, dipropyl phosphide, dibutyl phosphide, dihexyl phosphide, dicyclohexyl phosphide, dioctyl phosphide and the like; diaryl phosphide groups such as dibenzyl phosphide, diphenyl phosphide, dinaphthyl phosphide and the like.

The sulfide group having 1 to 20 carbon atoms includes alkyl sulfide groups such as methyl sulfide, ethyl sulfide, propyl sulfide, butyl sulfide, hexyl sulfide, cyclohexyl sulfide, octyl sulfide and the like; alkenyl sulfide groups such as vinyl sulfide, propenyl sulfide, cyclohexenyl sulfide and the like; arylalkyl sulfide groups such as benzyl sulfide, phenylethyl sulfide, phenylpropyl sulfide and the like; aryl sulfide groups such as phenyl sulfide, tolyl sulfide, dimethylphenyl sulfide, trimethylphenyl sulfide, ethylphenyl sulfide, propylphenyl sulfide, biphenyl sulfide, naphthyl sulfide, methylnaphthyl sulfide, anthracenyl sulfide, phenanthrenyl sulfide and the like.

The acyl group having 1 to 20 carbon atoms includes alkyl acyl groups such as formyl, acetyl, propionyl, butyryl, valeryl, palmitoyl, stearoyl, oleoyl and the like, aryl acyl groups such as benzoyl, toluoyl, salcyloyl, cynnamoyl, naphthoyl, phthaloyl and the like and oxalyl, malonyl, succinyl and the like which are derived respectively from dicarboxylic acids such as oxalic acid, malonic acid, succinic acid and the like.

On the other hand, Y represents a Lewis base, and when a plurality of Y is present, plural Y may be the same or different and may be cross-linked with other Y, $E^1$, $E^2$ or X.

The specific examples of above Y include amines, ethers, phosphines, thioethers and the like.

The amines include amines having 1 to 20 carbon atoms, and they include, to be specific, alkylamines such as methylamine, ethylamine, propylamine, butylamine, cyclohexylamine, methylethylamine, dimethylamine, diethylamine, dipropylamine, dibutylamine, dicyclohexylamine, methylethylamine and the like; alkenylamines such as vinylamine, propenylamine, cyclohexenylamine, divinylamine, dipropenylamine, dicyclohexenylamine and the like; arylalkylamines such as phenylamine, phenylethylamine, phenylpropylamine and the like; arylamines such as diphenylamine, dinaphthylamine and the like.

The ethers include aliphatic single ether compounds such as methyl ether, ethyl ether, propyl ether, isopropyl ether, butyl ether, isobutyl ether, n-amyl ether, isoamyl ether and the like; aliphatic mixed ether compounds such as methyl ethyl ether, methyl propyl ether, methyl isopropyl ether, methyl n-amyl ether, methyl isoamyl ether, ethyl propyl ether, ethyl isopropyl ether, ethyl butyl ether, ethyl isobutyl ether, ethyl n-amyl ether, ethyl isoamyl ether and the like; aliphatic unsaturated ether compounds such as vinyl ether, allyl ether, methyl vinyl ether, methyl allyl ether, ethyl vinyl ether, ethyl allyl ether and the like; aromatic ether compounds such as anisole, phenetole, phenyl ether, benzyl ether, phenyl benzyl ether, α-naphthyl ether, β-naphthyl ether and the like; cyclic ether compounds such as ethylene oxide, propylene oxide, trimethylene oxide, tetrahydrofuran, tetrahydropyran, dioxane and the like.

The phosphines include phosphines having 1 to 20 carbon atoms.

To be specific, they include alkylphosphines including hydrocarbon-monosubstituted phosphines such as methylphosphine, ethylphosphine, propylphosphine, butylphosphine, hexylphosphine, cyclohexylphosphine, octylphosphine and the like; hydrocarbon-disubstituted phosphines such as dimethylphosphine, diethylphosphine, dipropylphosphine, dibutylphosphine, dihexylphosphine, dicyclohexylphosphine, dioctylphosphine and the like; hydrocarbon-trisubstituted phosphines such as trimethylphosphine, triethylphosphine, tripropylphosphine, tributylphosphine, trihexylphosphine, tricyclohexylphosphine, trioctylphosphine and the like; monoalkenylphosphines such as vinylphosphine, propenylphosphine, cyclohexenylphosphine and the like and dialkenylphosphines obtained by substituting hydrogen atoms of phosphines with two alkenyls; trialkenylphosphines obtained by substituting hydrogen atoms of phosphines with three alkenyls; arylphosphines including arylalkylphosphines such as benzylphosphine, phenylethylphosphine, phenylpropylphosphine and the like; diarylalkylphosphines or aryldialkylphosphines obtained by substituting hydrogen atoms of phosphines with three aryls or alkenyls; phenylphosphine, tolylphosphine, dimethylphenylphosphine, trimethylphenylphosphine, ethylphenylphosphine, propylphenylphosphine, biphenylphosphine, naphthylphosphine, methylnaphthylphosphine, anthracenylphosphine, phenanthrenylphosphine; di(alkylaryl)phosphines obtained by substituting hydrogen atoms of phosphines with two alkylaryls; and tri(alkylaryl)phosphines obtained by substituting hydrogen atoms of phosphines with three alkylaryls. The thioethers include the sulfides described above.

Next, $A^1$ and $A^2$ are divalent cross-linking groups which bond two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —P(O)$R^1$—, —$BR^1$— or —$AlR^1$—, and $R^1$ represents a hydrogen atom, a halogen atom, a hydrocarbon group having 1 to 20 carbon atoms or a halogen-containing hydrocarbon group having 1 to 20 carbon atoms; they may be the same as or different from each other; q is an integer of 1 to 5 and represents [(valence of M)−2), and r represents an integer of 0 to 3.

Among the above cross-linking groups, at least one of them is preferably a cross-linking group comprising a hydrocarbon group having 1 or more carbon atoms.

The above cross-linking group includes, for example, a group represented by Formula (a):

[Ka 3]

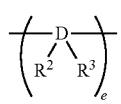

(a)

(D is an element of a 14th group in the periodic table and includes, for example, carbon, silicon, germanium and tin; $R^2$ and $R^3$ each are a hydrogen atom or a hydrocarbon group having 1 to 20 carbon atoms, and they may be the same as or different from each other and may be combined with each other to form a ring structure; and e represents an integer of 1 to 4).

The specific examples thereof include methylene, ethylene, ethylidene, propylidene, isopropylidene, cyclohexylidene, 1,2-cyclohexylene, vinylidene ($CH_2$=C=), dimethylsilylene, diphenylsilylene, methylphenylsilylene, dimethylgermylene, dimethylstanylene, tetramethyldisilylene, diphenyldisilylene and the like. Among them, ethylene, isopropylidene and dimethylsilylene are suited.

The specific examples of the double cross-linked transition metal compound represented by Formula (I) include (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)-(3,4-dimethylcyclopentadienyl)(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-isopropylcyclopentadienyl)(3'-methyl-5'-isopropylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyl)zirconium dichloride, (1,2'-dimethylsilylene) (2,1'-ethylene) (3-methyl-5-n-butylcyclopentadienyl) (3'-methyl-5'-n-butylcyclopentadienyl) zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene) (2,1'-methylene) (3-methyl-5-n-butylcyclopentadienyl) (3'-methyl-5'-n-butylcyclopentadienyl) zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropylidene)(3-methyl-5-isopropylcyclopentadienyl)(3'-methyl-5'-isopropylcyclopentadienyl)zirconium dichloride, (1,2'-methylene)(2,1'-methylene)(3-methyl-5-isopropylcyclopentadienyl)(3'-methyl-5'-isopropylcyclopentadienyl)zirconium dichloride, (1,2'-methylen)(2,1'-isopropylidene)(3-methyl-5-isopropylcyclopentadienyl)(3'-methyl-5'-isopropylcyclopentadienyl)zirconium dichloride and the like. Further, it includes compounds obtained by substituting zirconium in the above compounds with titanium or hafnium and compounds represented by Formula (II) which shall be described later.

Also, they may be similar compounds of metal elements of the other groups.

They are preferably the transition metal compounds of the 4th group in the periodic table, and among them, they are preferably the compounds of zirconium.

Among the transition metal compounds represented by Formula (I), a compound represented by Formula (II) is preferred:

[Ka 4]

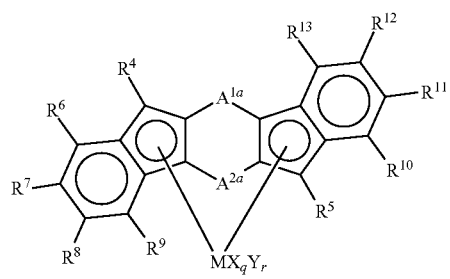

(II)

In Formula (II) described above, M represents a metal element of a 3rd to 10th group in the periodic table; $A^{1a}$ and $A^{2a}$ each represent the cross-linking group represented by Formula (a) in Formula (I) described above, and they are preferably $CH_2$, $CH_2CH_2$, $(CH_3)_2C$, $(CH_3)_2C(CH_3)_2C$, $(CH_3)_2Si$ and $(C_6H_5)_2Si$.

$A^{1a}$ and $A^{2a}$ may be the same as or different from each other.

$R^4$ to $R^{13}$ each represent a hydrogen atom, a halogen atom, a hydrocarbon group having 1 to 20 carbon atoms, a halogen-containing hydrocarbon group having 1 to 20 carbon atoms, a silicon-containing group or a hetero atom-containing group.

The halogen atom, the hydrocarbon group having 1 to 20 carbon atoms and the silicon-containing group include the same groups as explained in Formula (I) described above.

The halogen-containing hydrocarbon group having 1 to 20 carbon atoms includes p-fluorophenyl, 3,5-difluorophenyl, 3,4,5-trifluorophenyl, pentafluorophenyl, 3,5-bis(trifluoro)phenyl, fluorobutyl and the like.

The hetero atom-containing group includes hetero atom-containing groups having 1 to 20 carbon atoms, and it includes, to be specific, nitrogen-containing groups such as dimethylamino, diethylamino, diphenylamino and the like;

sulfur-containing groups such as phenyl sulfide, methyl sulfide and the like; phosphorus-containing groups such as dimethylphosphino, diphenylphosphino and the like; and oxygen-containing groups such as methoxy, ethoxy, phenoxy and the like.

Among them, groups containing hetero atoms such as halogen, oxygen and silicon are preferred as $R^4$ and $R^5$ since the polymerization activity is enhanced.

A hydrogen atom or the hydrocarbon group having 1 to 20 carbon atoms is preferred as $R^4$ to $R^{13}$.

X and Y are the same as in Formula (I). The term q is an integer of 1 to 5 and represents [(valence of M)−2], and r represents an integer of 0 to 3.

When both indenyl groups are the same in the double cross-linked transition metal compounds represented by Formula (II) described above, the transition metal compounds of the 4th group in the periodic table include (1,2'-dimethylsilylene)(2,1'-dimethylsilylene)bis(indenyl)zirconium dichloride, (1,2'-dimethylsilylene)(2,1'-dimethylsilylene)bis(3-methylindenyl)zirconium dichloride, (1,2'-dimethylsilylene)(2,1'-dimethylsilylene)bis(3-ethylindenyl)zirconium dichloride, (1,2'-dimethylsilylene)(2,1'-dimethylsilylene)bis(3-isopropylindenyl)zirconium dichloride, (1,2'-dimethylsilylene)(2,1'-dimethylsilylene)bis(3-trimethylsilylmethylindenyl)zirconium dichloride, (1,2'-dimethylsilylene)(2,1'-dimethylsilylene)bis(3-butylindenyl)zirconium dichloride, (1,2'-dimethylsilylene)(2,1'-dimethylsilylene)bis(4-methylindenyl)zirconium dichloride, (1,2'-dimethylsilylene)(2,1'-dimethylsilylene)bis(4,7-dimethylindenyl)zirconium dichloride, (1,2'-dimethylsilylene)(2,1'-dimethylsilylene)bis(5,6-dimethylindenyl)zirconium dichloride, (1,2'-dimethylsilylene)(2,1'-dimethylsilylene)bis(3-ethoxymethylindenyl)zirconium dichloride, (1,2'-dimethylsilylene)(2,1'-dimethylsilylene)bis(3-ethoxyethylindenyl)zirconium dichloride, (1,2'-dimethylsilylene)(2,1'-dimethylsilylene)bis(3-methoxymethylindenyl)zirconium dichloride, (1,2'-dimethylsilylene)(2,1'-dimethylsilylene)bis(3-methoxyethylindenyl)zirconium dichloride, (1,2'-phenylmethylsilylene)(2,1'-phenylmethylsilylene)bis(indenyl)zirconium dichloride, (1,2'-phenylmethylsilylene)(2,1'-phenylmethylsilylene)bis(3-methylindenyl)zirconium dichloride, (1,2'-dimethylsilylene)(2,1'-isopropylidene)bis(indenyl)zirconium dichloride, (1,2'-dimethylsilylene)(2,1'-isopropylidene)bis(3-methylindenyl)zirconium dichloride, (1,2'-dimethylsilylene)(2,1'-isopropylidene)bis(3-isopropylindenyl)zirconium dichloride, (1,2'-dimethylsilylene)(2,1'-isopropylidene)bis(3-n-butylindenyl)zirconium dichloride, (1,2'-dimethylsilylene)(2,1'-isopropylidene)bis(3-trimethylsilylmethylindenyl)zirconium dichloride, (1,2'-dimethylsilylene)(2,1'-isopropylidene)bis(3-trimethylsilylindenyl)zirconium dichloride, (1,2'-dimethylsilylene)(2,1'-isopropylidene)bis(3-phenylindenyl)zirconium dichloride, (1,2'-dimethylsilylene)(2,1'-methylene)bis(indenyl)zirconium dichloride, (1,2'-dimethylsilylene)(2,1'-methylene)bis(3-methylindenyl)zirconium dichloride, (1,2'-dimethylsilylene)(2,1'-methylene)bis(3-isopropylindenyl)zirconium dichloride, (1,2'-dimethylsilylene)(2,1'-methylene)bis(3-n-butylindenyl)zirconium dichloride, (1,2'-dimethylsilylene)(2,1'-methylene)bis(3-trimethylsilylmethylindenyl)zirconium dichloride, (1,2'-dimethylsilylene)(2,1'-methylene)bis(3-trimethylsilylindenyl)zirconium dichloride, (1,2'-diphenylsilylene)(2,1'-methylene)bis(indenyl)zirconium dichloride, (1,2'-diphenylsilylene)(2,1'-methylene)bis(3-methylindenyl)zirconium dichloride, (1,2'-diphenylsilylene)(2,1'-methylene)bis(3-n-butylindenyl)zirconium dichloride, (1,2'-diphenylsilylene)(2,1'-methylene)bis(3-trimethylsilylmethylindenyl)zirconium dichloride, (1,2'-diphenylsilylene)(2,1'-methylene)bis(3-trimethylsilylindenyl)zirconium dichloride and the like. Further, they include compounds obtained by substituting zirconium in the above compounds with titanium or hafnium, but they shall not be restricted to the above compounds.

Also, they may be similar compounds of metal elements of the other groups than the 4th group.

They are preferably the transition metal compounds of the 4th group in the periodic table, and among them, they are preferably the compounds of zirconium.

On the other hand, in a case in which $R^5$ is a hydrogen atom and in which $R^4$ is not a hydrogen atom in the double cross-linked transition metal compounds represented by Formula (II) described above, the transition metal compounds of the 4th group in the periodic table include (1,2'-dimethylsilylene)(2,1'-dimethylsilylene)(indenyl)(3-trimethylsilylmethylindenyl)zirconium dichloride, (1,2'-dimethylsilylene)(2,1'-dimethylsilylene)(indenyl)(3-methylindenyl)zirconium dichloride, (1,2'-dimethylsilylene)(2,1'-dimethylsilylene)(indenyl)(3-trimethylsilylindenyl)zirconium dichloride, (1,2'-dimethylsilylene)(2,1'-dimethylsilylene)(indenyl)(3-phenylindenyl)zirconium dichloride, (1,2'-dimethylsilylene)(2,1'-dimethylsilylene)(indenyl)(3-benzylindenyl)zirconium dichloride, (1,2'-dimethylsilylene)(2,1'-dimethylsilylene)(indenyl)(3-neopentylindenyl)zirconium dichloride, (1,2'-dimethylsilylene)(2,1'-dimethylsilylene)(indenyl)(3-phenetylindenyl)zirconium dichloride, (1,2'-ethylene)(2,1'-ethylene)(indenyl)(3-trimethylsilylmethylindenyl)zirconium dichloride, (1,2'-ethylene)(2,1'-ethylene)(indenyl)(3-methylindenyl)zirconium dichloride, (1,2'-ethylene)(2,1'-ethylene)(indenyl)(3-trimethylsilylindenyl)zirconium dichloride, (1,2'-ethylene)(2,1'-ethylene)(indenyl)(3-phenylindenyl)zirconium dichloride, (1,2'-ethylene)(2,1'-ethylene)(indenyl)(3-benzylindenyl)zirconium dichloride, (1,2'-ethylene)(2,1'-ethylene)(indenyl)(3-neopentylindenyl)zirconium dichloride, (1,2'-ethylene)(2,1'-ethylene)(indenyl)(3-phenethylindenyl)zirconium dichloride and the like. Further, they include compounds obtained by substituting zirconium in the above compounds with titanium or hafnium, but they shall not be restricted to the above compounds.

Also, they may be similar compounds of metal elements of the other groups than the 4th group.

They are preferably the transition metal compounds of the 4th group in the periodic table, and among them, they are preferably the compounds of zirconium.

The compound (B) which can be reacted with the transition metal compound constituting the catalyst used in the present invention to form an ionic complex is preferably a borate compound from the viewpoints that a high purity end-unsaturated olefin base polymer having a relatively low molecular weight is obtained and that the catalyst is provided with a high activity.

The borate compound includes triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl (methyl)ammonium tetraphenylborate, trimethylanilinium tetraphenylborate, methylpyridium tetraphenylborate, benzylpyridinium tetraphenylborate, methyl(2-cyanopyridium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridium tetrakis(pentafluorophenyl)borate, benzylpyridium tetrakis(pentafluorophenyl)borate, methyl(2-cyanopyridium) tetrakis(pentafluorophenyl)borate, benzyl(2-cyanopyridium) tetrakis(pentafluorophenyl)borate, methyl (4-cyanopyridium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, triphenylcarbenium tetrakis (pentafluorophenyl)borate, methylanilinium tetrakis (perfluorophenyl)borate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrinmanganese tetrakis(pentafluorophenyl)borate, silver tetrafluoroborate and the like. They can be used alone or in combination of two or more kinds thereof. When a mole ratio (hydrogen/transition metal compound) of hydrogen to the transition metal compound is 0 as described later, preferred are dimethylanilium tetrakis(pentafluorophenyl)borate, triphenylcarbenium tetrakis(pentafluorophenyl)borate and methylanilium tetrakis(perfluorophenyl)borate.

The catalyst used in the production process of the present invention may comprise combination of the component (A) and the component (B) each described above or may be prepared by using an organic aluminum compound as a component (C) in addition to the component (A) and the component (B).

The organic aluminum compound of the component (C) includes trimethylaluminium, triethylaluminium, triisopropylaluminium, triisobutylaluminium, tri-n-hexylaluminum, tri-n-octylaluminium, dimethylaluminium chloride, diethylaluminium chloride, methylaluminium dichloride, ethylaluminium dichloride, dimethylaluminium fluoride, diisobutylaluminium hydride, diethylaluminium hydride, ethylaluminium sesquichloride and the like.

The above organic aluminum compounds may be used alone or in combination of two or more kinds thereof.

Among them, preferred in the present invention are trialkylaluminums such as trimethylaluminium, triethylaluminum, triisopropylaluminium, triisobutylaluminum, tri-n-hexylaluminum and tri-n-octylaluminum, and triisobutylaluminum, tri-n-hexylaluminum and tri-n-octylaluminum are more preferred.

A use amount of the component (A) is usually $0.1 \times 10^{-6}$ to $1.5 \times 10^{-5}$ mole/L, preferably $0.15 \times 10^{-6}$ to $1.3 \times 10^{-5}$ mole/L, more preferably $0.2 \times 10^{-6}$ to $1.2 \times 10^{-5}$ mole/L and particularly preferably $0.3 \times 10^{-6}$ to $1.0 \times 10^{-5}$ mole/L.

If a use amount of the component (A) is $0.1 \times 10^{-6}$ mole/L or more, the catalyst activity is sufficiently exerted, and if it is $1.5 \times 10^{-5}$ mole/L or less, polymerization heat can readily be removed.

A use proportion (A)/(B) of the component (A) to the component (B) is preferably 10/1 to 1/100, more preferably 2/1 to 1/10 in terms of a mole ratio.

If (A)/(B) falls in a range of 10/1 to 1/100, not only an effect of the catalyst is obtained, but also the catalyst cost per a unit mass of the polymer can be controlled. Also, a large amount of boron is not likely to be present in the targeted reactive polyolefin.

A use proportion (A)/(C) of the component (A) to the component (C) is preferably 1/1 to 1/10000, more preferably 1/5 to 1/2000 and further preferably 1/10 to 1/1000 in terms of a mole ratio.

Use of the component (C) makes it possible to enhance the polymerization activity per the transition metal. If (A)/(C) falls in a range of 1/1 to 1/10000, a balance between an addition effect of the component (C) and the economical efficiency is good, and a large amount of aluminum is not likely to be present in the targeted reactive polyolefin.

In the production process of the present invention, preliminary contact can be carried out as well by using the component (A) and the component (B) or the component (A), the component (B) and the component (C).

The preliminary contact can be carried out by bringing, for example, the component (A) into contact with the component (B). A method therefor shall not specifically be restricted, and publicly known methods can be used.

The above preliminary contact enhances the catalyst activity and reduces a use proportion of the component (B) which is a promoter, so that it is effective for reducing the catalyst cost.

The reactive polyolefin of the present invention is preferably reduced in the catalyst residue described above. In particular, a content of transition metals is 5 ppm by mass or less; a content of aluminum is 300 ppm by mass or less; and a content of boron is 5 ppm by mass or less.

The transition metals include titanium, zirconium, hafnium and the like, and a total amount of them is 5 ppm by mass or less.

A content of aluminum is preferably 280 ppm by mass or less.

The above metal components can be measured by means of an ICP (high frequency induction coupling plasma spectroscopic analysis) measuring equipment.

Use of the reactive polyolefin having less catalyst residue provides the resulting graft copolymer with a high purity and therefore is preferred.

Monomer for Main Chain:

As described above, the main chain of the graft copolymer used in the present invention contains the monomer unit having a hydrophilic group. The above main chain can be formed by carrying out polymerization reaction using a monomer having a hydrophilic group.

In general, monomers having a functional group such as a hydrophilic group and the like are different in a reactivity according to the kind of the functional group. Accordingly, suitable combination of the monomers is preferably used in order to produce the graft copolymer having a main chain provided with desired properties and a desired length in the present invention. Explanations shall be given below dividing the combination into a case in which a dibasic acid compound such as maleic acid and the like is used as the monomer and a case in which it is not used.

When the dibasic acid compound is not used as the monomer, monomers represented by the following compounds [I] to [III] are preferred as the monomer having a hydrophilic group.

[I] Acrylic acid and derivatives thereof:
(1) Acrylic acid,
(2) long chain polyalkylene type glycols having a hydroxyl group and having a molecular weight of 30000 or less, for example, polyethylene glycol monoacrylate, polyethylene glycol polypropylene glycol acrylate, poly(ethylene glycol-n-tetramethylene glycol) monoacrylate, propylene glycol polybutylene glycol monoacrylate, propylene glycol polybutylene glycol monoacrylate, polypropylene glycol monoacrylate, polyethylene glycol monomethacrylate, polypropylene glycol monomethacrylate, poly(ethylene glycol.polypropylene glycol) monomethacrylate, poly(ethylene glycol.tetramethylene glycol) monomethacrylate and propylene glycol.polybutylene glycol monomethacrylate, (3) metal acrylates comprising acrylic acid and typical metal elements, for example, sodium acrylate, potassium acrylate, magnesium acrylate and calcium acrylate, (4) acrylic esters having a hydroxyl group, for example, 2-hydroxyethyl acrylate, 2-hydroxypropyl acrylate, 2-hydroxy-3-phenoxypropyl acrylate, 4-hydroxybutyl acrylate, 2-hydroxyethyl methacrylate and hydroxypropyl methacrylate, (5) acrylamides and N-substituted acrylamides, for example, N-methylacrylamide, N-ethylacrylamide, N-isopropylacrylamide, N-cyclohexylacrylamide, N,N-dimethylacrylamide, N,N-diethylacrylamide, N,N-dibutylacrylamide, N,N-dicyclohexylacrylamide, N-(2-hydroxyethyl)-acrylamide, N-(2-hydroxypropyl)-acrylamide, N,N-dimethylaminoethylacrylamide and N-methylolacrylamide, (6) alkyl group-end or aryl group-end polyalkylene type glycols having a molecular weight of 30000 or less, for example, methoxyethylene glycol acrylate, lauroxypolyethylene glycol acrylate, phenoxypolyethylene glycol acrylate, methoxyethylene glycol methacrylate, lauroxypolyethylene glycol methacrylate, phenoxypolyethylene glycol methacrylate and phenoxypolyethylene glycol.polypropylene glycol methacrylate.

[II] Methacrylic acid and α-alkyl-substituted products of acrylic acid (hereinafter, they shall be abbreviated together as "methacrylic acids") and derivatives thereof:

Monomers having an alkyl group (preferably an alkyl group having 6 or less carbon atoms) such as methyl and the like in an α-position of the monomers of [I] described above.

[III] Vinyl esters and derivatives thereof, for example, vinyl acetate, vinyl propionate, vinyl isobutyrate, vinyl pivalate, vinyl undecanoate, vinyl palmitate and the like (partially saponified products and completely saponified products of polymers obtained by using the vinyl esters described above are preferred).

In addition to the monomers of [I] to [III] described above, [IV] nitrogen-containing vinyl compounds such as vinylpyridine, vinylpyrrolidone and the like can be listed as the preferred monomers. In a case in which the above monomers having a hydrophilic group are used to carry out polymerization reaction, an amount of the monomer unit having a hydrophilic group in the main chain is preferably 40 mol % or more, more preferably 50 mol % or more.

The main chain of the graft copolymer of the present invention may be formed by copolymerizing with other monomers in addition to the monomer having a hydrophilic group. The preferred other monomers include monomers selected from styrenes and acrylic esters. Carrying out copolymerization with the above monomers makes it possible to control a hydrophilicity and a hydrophobicity of the main chain and makes it possible to control a water dispersibility of the graft copolymer and a compatibility thereof with a dispersion component such as a pigment and the like, and the dispersion stability is enhanced. Also, a reactivity of a monomer in which it is usually difficult to increase a content thereof can be enhanced, and an amount of the monomer unit can be increased.

The monomers of styrenes include styrene and derivatives thereof including alkylstyrenes such as α-methylstyrene, p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene and the like; alkoxystyrenes such as p-methoxystyrene, o-methoxystyrene, m-methoxystyrene and the like; halogenated styrenes such as p-chlorostyrene, m-chlorostyrene, o-bromostyrene, p-fluorostyrene, m-fluorostyrene, o-fluorostyrene, o-methyl-p-fluorostyrene and the like; trimethylsilylstyrene and vinyl acetate.

The monomers of acrylic esters include acrylic esters and methacrylic esters such as methyl(meth)acrylate, ethyl(meth)acrylate, butyl(meth)acrylate, n-octyl(meth)acrylate, 2-ethylhexyl acrylate and the like.

When the dibasic acid compound is used as the monomer for the main chain, monomers of at least one selected from the following group A and at least one selected from the following group B are preferably used in combination as the monomer having a hydrophilic group.

Group A:
[V] Maleic anhydride and substitution products thereof
[VI] Maleic acid and esters thereof
[VII] Maleimide and substitution products thereof.
Group B:
[I] Acrylic acid and derivatives thereof:
[II] Methacrylic acids and derivatives thereof:
[III] Vinyl esters and derivatives thereof:

The specific examples of the monomers of the group A include:

[V] maleic anhydride and substitution products thereof such as maleic anhydride, methylmaleic anhydride, dimethylmaleic anhydride, phenylmaleic anhydride, diphenylmaleic anhydride and the like,

[VI] maleic acid and substitution products thereof such as maleic acid, methylmaleic acid and the like, and monomers which are ester compounds thereof and have a hydrophilic group and

[VII] maleimide and substitution products thereof such as maleimide, N-alkyl-substituted maleimide, N-methylmaleimide, N-ethylmaleimide, N-phenylmaleimide and the like.

Among them, maleic anhydride is preferred.

Compounds shown as the examples of the monomers [I] to [III] of the group B include the compounds described above.

The monomers of the group A described above have a small electron density of a double bond, and therefore the monomers of the same kind are less liable to be polymerized. Accordingly, in the present invention, a content of the monomer in the group A is elevated by polymerizing it in combination with the monomer of the group B. Also, in the present invention, use of the monomer in the group A makes it possible to enhance a reactivity of the reactive polyolefin, and therefore the effect that the graft copolymer can efficiently be produced can be obtained as well.

In combination of the compound of the group A and the compound of the group B, the compound of the group A/the compound of the group B (mole ratio) falls in a range of usually 0.1 to 2, preferably 0.5 to 1.5, more preferably 0.8 to 1.2 and further preferably 0.9 to 1.1.

If the mole ratio is 0.1 or more, a graft polymerization amount of the compound of the group A is elevated, and if it is 2 or less, a copolymer comprising the compound of the group A and the compound of the group B which do not participate in the graft polymerization is not by-produced. Accordingly, both are preferred.

When the monomer of the group A described above is used in combination with the monomer of the group B to carry out polymerization reaction, an amount of the monomer unit having a hydrophilic group in the main chain is preferably 40 mol % or more, more preferably 50 mol % or more.

Monomers which are used in addition to the monomer of the group A and the monomer of the group B to form the main chain include the styrenes and the acrylic esters each described above, and in addition to them, α-olefins may be used. Compounds shown as the examples of the α-olefins include α-olefins having 2 to 28 carbon atoms such as ethylene, propylene, 1-butene, 1-hexene, 1-heptene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene and the like. Use of the above monomers makes it possible, as described above, to control a hydrophilicity and a hydrophobicity of the main chain and increase an amount of the monomer unit which is less liable to be reacted.

The radical initiator used in the graft copolymerization of the present invention shall not specifically be restricted, and compounds suitably selected from radical initiators which have so far been publicly known, for example, various organic peroxides, azo base compounds and the like can be used. Both compounds are suitable radical initiators.

The organic peroxides include, for example, diacylperoxides such as dibenzoyl peroxide, di-8,5,5-trimethylhexanoyl peroxide, dilauroyl peroxide, didecanoyl peroxide, di(2,4-dichlorobenzoyl)peroxide and the like, hydroperoxides such as t-butyl hydroperoxide, cumene hydroperoxide, diisopropylbenzenehydroperoxide, 2,5-dimethylhexane-2,5-dihydroperoxide and the like, dialkyl peroxides such as di-t-butyl peroxide, dicumyl peroxide, 2,5-dimethyl-2-5-di(t-butylperoxy)hexane, 2,5-dimethyl-2,5-di(t-butylperoxy)hexyne-3, α,α'-bis(t-butylperoxy)diisopropylbenzene and the like, peroxyketals such as 1,1-bis-t-butylperoxy-3,3,5-trimethylcyclohexane, 2,2-bis(t-butylperoxy)butane and the like, alkylperesters such as t-butylperoxyoctoate, t-butylperoxypivalate, t-butylperoxyneodecanoate, t-butylperoxybenzoate and the like, peroxycarbonates such as di-2-ethylhexylperoxydicabonate, diisopropylperoxydicarbonate, di-sec-butylperoxydicarbonate, t-butylperoxyisopropyl carbonate and the like. Among them, the dialkyl peroxides are preferred.

The azo base compounds include azobisisobutyronitrile, azobisisovaleronitrile and the like.

The radical initiators may be used alone or in combination of two or more kinds thereof.

A use amount of the radical initiator in the graft copolymerization reaction shall not specifically be restricted and is suitably selected according to the desired physical properties of the graft copolymer.

The radical initiator is used in a range of 0.001 to 10 parts by mass, preferably 0.005 to 5 parts by mass based on 100 parts by mass of the reactive polyolefin.

A use amount of the monomer for forming the main chain described above can suitably be determined according to the purposes, and it is selected in a range of 0.2 to 200 parts by mass based on 100 parts by mass of the reactive polyolefin. A use amount thereof falls in a range of preferably 0.3 to 150 parts by mass, more preferably 0.4 to 130 parts by mass and further preferably 1 to 100 parts by mass. If the use amount is 0.2 part by mass or more, an amount of the monomer copolymerized in the graft copolymer is elevated, and the performances such as the compatibility and the like are liable to be exerted. If it is 200 parts by mass or less, a polymer which does not participate in the graft polymerization is not by-produced. Accordingly, both are preferred.

The graft polymerization method shall not specifically be restricted, and the graft polymer can be produced, for example, by melting and kneading the reactive polyolefin, the monomers and the radical initiator each described above by means of a roll mill, a Banbury mixer, an extruding equipment or the like to react them. The reaction conditions include a temperature of 60 to 140° C. and a time of 0.01 to 0.5 hour.

Further, the graft polymer can be produced in a hydrocarbon base solvent such as butane, pentane, hexane, cyclohexane, toluene and the like, a halogenated hydrocarbon base solvent such as chlorobenzene, dichlorobenzene, trichlorobenzene and the like and a suitable organic solvent such as liquefied α-olefin and the like or on a solventless condition. The reaction conditions include a temperature of 40 to 140° C., preferably 50 to 140° C. and a time of 0.1 to 10 hours.

When the graft polymerization is carried out on a high temperature condition usually used, a molecular weight and a viscosity of the reactive polyolefin are liable to be reduced by decomposition thereof, and gel is liable to be produced by cross-linking reaction. In the conditions described above, however, the temperature is relatively low, and the molecular weight and the viscosity are not reduced. Side reactions such as cross-linking reaction are controlled as well.

The graft polymerization of the present invention may be carried out under the presence of a Lewis acid, and the Lewis acid includes the following compounds.

(1) Halides (chloride, bromide, fluoride and iodide), alkylated compounds (hydrocarbon groups having 1 to 20 carbon atoms) and halogenated alkylated compounds of 2nd to 4th group elements in the periodic table.

(2) Lewis acids comprising aluminum, boron, zinc, tin, magnesium and calcium atoms.

The specific examples of the Lewis acids include magnesium chloride, calcium chloride, zinc chloride, boron trichloride, aluminum trichloride, gallium trichloride, silicon tetrachloride and compounds obtained by substituting chlorine atoms of the above compounds with bromine atoms and fluorine atoms, butylethylmagnesium, diethylzinc, trimethylaluminum, triethylaluminum, triisobutylaluminum, tri-n-hexylaluminum, trimethylboron, triethylboron, triethylgallium, trimethylgallium, diethylaluminum monochloride, ethylaluminum dichloride and ethylaluminum sesquichloride and the like. Among them, the zinc compounds, the aluminum compounds and the boron compounds are preferred.

A use amount of the Lewis acid in the graft polymerization reaction is 0.01 to 1, preferably 0.05 to 1 and more preferably 0.1 to 0.5 in terms of the Lewis acid/the monomer (mole/mole). If the Lewis acid/the monomer (mole/mole) is 0.01 or more, the graft rate grows high, and if it is 1 or less, a residue of the Lewis acid is not required to be removed by deashing, so that it is preferred because of the reason that coloring is prevented.

The Lewis acid is added before adding the radical initiator to carry out the graft polymerization reaction or the Lewis acid which is brought in advance into contact with the monomers [I] to [VIII] is used to thereby carry out the graft polymerization reaction.

Aqueous Dispersion and Production Process Therefor:

The aqueous dispersion of the present invention is prepared by dispersing the graft copolymer described above in water. A diameter of the dispersed particles shall not specifically be restricted and can suitably be determined according to the purposes, and it is usually 0.01 to 200 μm.

When the aqueous dispersion is used as a treating agent for adhesives, fillers and fibers, usually a diameter of the dispersed particles is preferably 0.01 to 200 µm, more preferably 0.01 to 100 µm, further preferably 0.01 to 50 µm and most preferably 0.01 to 10 µm. The diameter falling in the ranges described above makes it possible to carry out the even surface treatment and therefore is preferred.

When the aqueous dispersion is used as a component for coating materials and inks, usually a diameter of the dispersed particles is preferably 0.01 to 1 µm, more preferably 0.01 to 0.5 µm, more preferably 0.01 to 0.3 µm, further preferably 0.01 to 0.2 µm and most preferably 0.01 to 0.1 µm. The diameter falling in the ranges described above is preferred in terms of an evenness and an appearance of the coating film. Also, when the aqueous dispersion is used, as described later, in a mixture with other water-dispersed resins, a diameter of the dispersed particles is preferably small, and a smaller diameter of the dispersed particles in the graft copolymer than a diameter of the particles in the above water-dispersed resins allows an adhesive property thereof to a polyolefin base material to be exerted and allows an excellent appearance of the coating film to be obtained.

The aqueous dispersion of the present invention can be reduced, as described above, in a diameter of the dispersed particles, and it has a high stability and is less liable to bring about coagulation and separation in preservation and storage. Also, use thereof in combination with a small amount of a surfactant, as described later, makes it possible to enhance further the stability.

A diameter of the dispersed particles can be measured by laser diffraction and a scattering method using water as a dispersion medium. The diameter of the dispersed particles described above is a value determined in terms of a volume basis average particle diameter (50% particle diameter).

A process for producing the aqueous dispersion of the present invention includes two processes. The first production process is a process in which the graft copolymer is dissolved in a solvent other than water and in which water is then added thereto to produce the aqueous dispersion, and the second production process is a process in which the graft copolymer is brought into contact with water at a temperature of melting the graft copolymer or higher and in which the mixture is stirred to produce the aqueous dispersion. When the aqueous dispersion is reduced in a diameter of the dispersed particles, the first production process is preferred. The respective production processes shall be explained below.

In the first production process for the aqueous dispersion, conditions on which the graft copolymer is dissolved in a solvent are preferably a temperature of 20 to 150° C. and a concentration of 10 to 100 parts by mass for the graft copolymer based on 100 parts by mass of the solvent.

Further, conditions for adding water are a temperature of 20 to 100° C., preferably 20 to 80° C. and an addition amount of preferably 50 to 1000 parts by mass for water based on 100 parts by mass of the solvent. An addition speed of water is preferably a condition on which a substitution speed of the solvent is 0.1 to 5% by mass/minute, and a stirring speed thereof is preferably 100 to 10000 rpm.

After adding water, the solvent is removed under reduced pressure at a temperature of not lower than a boiling point of the solvent or a temperature falling in a range of 30 to 95° C. An amount of the residual solvent is 20% by mass or less, preferably 10% by mass or less and more preferably 5% by mass or less based on water.

The solvent includes, for example, aromatic hydrocarbons such as toluene, xylene and the like, aliphatic hydrocarbons such as hexane, octane, decane and the like, alicyclic hydrocarbons such as cyclohexane, methylcyclohexane and the like, halogenated hydrocarbons such as methylene chloride, carbon tetrachloride, chlorobenzene and the like, esters such as methyl acetate, ethyl acetate, propyl acetate, butyl acetate and the like, ketones such as acetone, methyl ethyl ketone, methyl propyl ketone, methyl isobutyl ketone, cyclohexanone and the like, alcohols such as methanol, ethanol, n-propanol, isopropanol, n-butanol, 2-butanol, isobutanol, t-butanol, cyclohexanol, ethylene glycol, propylene glycol, butanediol and the like, ethers such as dipropyl ether, dibutyl ether, tetrahydrofuran and the like, organic solvents having two or more functional groups such as 2-methoxyethanol, 2-ethoxyethanol, 2-butoxyethanol, 2-methoxypropanol, 2-ethoxypropanol, diacetone alcohol and the like and polar solvents such as dimethylformamide, dimethylsulfoxide and the like.

Among the solvents described above described above, the solvents which are dissolved by 1% by mass or more in water are preferred, and the solvents which are dissolved by 5% by mass or more are more preferred. To be specific, they include methyl ethyl ketone, methyl propyl ketone, cyclohexanone, n-propanol, isopropanol, n-butanol, 2-butanol, isobutanol, t-butanol, cyclohexanol, tetrahydrofuran, 2-methoxyethanol, 2-ethoxyethanol, 2-butoxyethanol, 2-methoxypropanol, 2-ethoxypropanol and diacetone alcohol.

In the second production process for the aqueous dispersion, conditions on which the graft copolymer is brought into contact with water are preferably a temperature of 20 to 170° C., a concentration of 10 to 100 parts by mass for the graft copolymer based on 100 parts by mass of water, a stirring speed of 100 to 10000 rpm and a time of 10 minutes to 10 hours. When the temperature exceeds 100° C., a pressure-proof stirring bath of a tightly closed system is preferably used.

The aqueous dispersion is produced on the conditions described above and gradually cooling down to room temperature while stirring. Further, various equipments can be used as a method for accelerating dispersion by a mechanical method, and capable of being used are, for example, mixers such as a dissolver, a homogenizer, a homo mixer and the like or dispersing equipments such as a paint shaker, a ball mill, a sand mill, an attracter, a roll mill, a kneader and the like.

Other components may be added to the aqueous dispersion of the present invention according to the purposes. The above components include surfactants, water-soluble high polymer compounds, water-based resin dispersions, pigments, basic materials, acid materials and polyolefins.

In the present invention, the surfactants contribute to a reduction in a diameter of the dispersed particles and stabilization thereof. The surfactants include anionic surfactants, nonionic surfactants, cationic surfactants, reactive surfactants and amphoteric surfactants. A content of the surfactant in the aqueous dispersion is usually 10 parts by mass or less, preferably 5 parts by mass or less, more preferably 2 parts by mass or less and most preferably 1 part by mass or less based on 100 parts by mass of the resin component (the graft copolymer and a resin of an aqueous resin dispersion described later are included in "the resin component", and the same shall apply in subsequent explanations). The graft copolymer used for the aqueous dispersion of the present invention is provided with a specific stereoregularity in a polyolefin chain and has a high content of a hydrophilic group, and therefore the surfactant can be reduced. A reduction in the surfactant makes it possible to inhibit bleeding out when the aqueous dispersion is used for a coating material. Also, the coating film can be improved in a water resistance and an oil resistance (a gas hole resistance). Further, coated articles having an excellent appearance are obtained. Consequently, according to the present invention, coating films and adhesive layers which are excellent in all of an adhesive property, a water resistance, a moisture resistance, an oil resistance (a gas hole resistance), a mechanical strength and a chemical resistance can be formed.

Nonionic surfactants are less liable to reduce the water resistance as compared with anionic surfactants and cationic surfactants, and therefore a little large amount thereof may be added. For example, in a case in which a surfactant other than the nonionic surfactants has to be added in an amount of 5 parts by mass or less based on 100 parts by mass of the resin component, the nonionic surfactants can be added in an amount of up to about 10 parts by mass.

The specific examples of the anionic surfactants include sodium dodecylbenzenesulfonate, sodium laurylsulfate, sodium dialkylsulfosuccinate, sodium sulfosuccinate, sodium polyoxyethylenelaurylsulfate ether, sodium polyoxyethylenealkylethersulfate, sodium polyoxyethylenealkylphenylethersulfate, methyltaurates, ethersulfonates, phosphates and the like.

The specific examples of the nonionic surfactants include polyoxyethylene alkyl ethers such as polyoxyethylene cetyl ether, polyoxyethylene stearyl ether, polyoxyethylene lauryl ether and the like; polyoxyethylene alkylphenyl ethers such as polyoxyethylene nonylphenyl ether, polyoxyethylene octylphenyl ether and the like; polyoxyethylene sorbitan fatty acid esters such as polyoxyethylene sorbitan monolaurate, polyoxyethylene sorbitan monooleate and the like; polyoxyethylene polyoxypropylene block copolymers in which an addition amount of ethylene oxide is 10 to 80% by mass.

The cationic surfactants include stearyltrimethylammonium chloride, cetyltrimethylammonium bromide and the like.

The reactive surfactants include surfactants having a radically polymerizable functional group among the surfactants described above, and when a reactive surfactant is used, a coating film and the like which are formed by the aqueous dispersion can be improved in a water resistance. The specific examples of the reactive surfactants Eleminol JS-2 (manufactured by Sanyo Chemical Industries, Ltd.), Latemul S-180 (manufactured by Kao Corporation) and the like.

The amphoteric surfactants include an amino acid base such as sodium alkylaminofatty acid and the like, a betaine base such as alkyl betaine, carboxybetaine, sulfobetaine, phosphobetaine and the like, an amine oxide base such as alkylamine oxide and the like.

Water-Soluble High Polymer Compound:

In the present invention, a water-soluble high polymer compound is used for a protective colloid. The water-soluble high polymer compound wraps emulsion particles of the graft copolymer and the like to contribute to an improvement in a storage stability of the aqueous dispersion. A content of the water-soluble high polymer compound is usually 0.01 to 1 part by mass, preferably 0.01 to 0.6 part by mass based on 100 parts by mass of the resin component. If the content falls in the ranges described above, the aqueous dispersion is excellent in a storage stability, and a coating film and the like containing the aqueous dispersion can be inhibited from being sticky.

The specific examples of the water-soluble high polymer compound include poly(meth)acrylic acid salts, polyvinyl alcohol, fiber base derivatives and the like. The poly(meth)acrylic acid salts include poly(sodium acrylate) and the like. Polyvinyl alcohol includes completely saponified polyvinyl alcohol, partially saponified polyvinyl alcohol and polyvinyl alcohol of a modified type (sulfonic acid-modified polyvinyl alcohol, carboxyl group-modified polyvinyl alcohol, silanol group-modified polyvinyl alcohol and acetoacetylated polyvinyl alcohol) and the like. The fiber base derivatives include methyl cellulose, hydroxyethyl cellulose and the like.

Aqueous Resin Dispersion:

In the present invention, an aqueous resin dispersion can be further used according to the applications of the aqueous dispersion. A diameter of dispersed particles in the aqueous resin dispersion is preferably 0.01 to 1.0 µm, more preferably 0.01 to 0.5 µm and further preferably 0.05 to 0.5 µm. A use amount of the aqueous resin dispersion is preferably 10 to 1000 parts by mass based on 100 parts by mass of the graft copolymer. The resin of the aqueous resin dispersion includes (a) acryl resins, (b) polyurethane resins, (c) polyester resins, (d) epoxy resins and (e) vinyl ester resins.

(a) Acryl Resin:

Monomers for producing the acryl resin of the present invention include (meth)acrylic acid and derivatives thereof. The above derivatives include (meth)acrylic esters having an alkyl group having 1 to 12 carbon atoms, (meth)acrylic esters having an aryl group or an aralkyl group having 6 to 12 carbon atoms, (meth)acrylic esters having an alkyl group having 1 to 20 carbon atoms and containing a hetero atom, (meth)acrylic esters having an alkyl group having 1 to 20 carbon atoms and containing a fluorine atom and (meth)acrylamide base monomers.

The (meth)acrylic esters having an alkyl group having 1 to 12 carbon atoms include methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, pentyl(meth)acrylate, hexyl(meth)acrylate, cyclohexyl(meth)acrylate, octyl(meth)acrylate, 2-ethylhexyl(meth)acrylate, nonyl(meth)acrylate, decyl(meth)acrylate, dodecyl(meth)acrylate and the like.

The (meth)acrylic esters having an aryl group or an aralkyl group having 6 to 12 carbon atoms include phenyl(meth)acrylate, benzyl(meth)acrylate and the like.

The (meth)acrylic esters having an alkyl group having 1 to 20 carbon atoms and containing a hetero atom include dimethylaminoethyl(meth)acrylate, diethylaminoethyl(meth)acrylate, 2-aminoethyl(meth)acrylate, glycidyl(meth)acrylate, 2-hydroxyethyl(meth)acrylate, hydroxybutyl(meth)acrylate, 2-methoxyethyl(meth)acrylate, 3-methoxypropyl(meth)acrylate, addition products of polyethylene oxide and the like.

The (meth)acrylic esters having an alkyl group having 1 to 20 carbon atoms and containing a fluorine atom include trifluoromethylmethyl(meth)acrylate, 2-trifluoromethylethyl(meth)acrylate, 2-perfluoroethylethyl(meth)acrylate and the like.

The (meth)acrylamide base monomers include (meth)acrylamide, (meth)acryldimethylamide and the like.

A macro monomer which is a polymer of a (meth)acryl base having a double bond at an end of a molecule may be used as a monomer other than the monomers described above. A weight average molecular weight of the macro monomer is preferably 200 to 50000. The macro monomer is preferably used in a range of usually 1 to 80 parts by mass based on 100 parts by mass of (meth)acrylic acid and/or the derivative thereof described above.

Further, caprolactone-modified (meth)acryl base oligomers, end hydroxyl group-containing (meth)acryl base oligomers, oligoester (meth)acryl base oligomers, urethane (meth)acrylates, epoxy(meth)acrylates and the like can also be used as the monomer.

A polymerization method for producing the acryl resin shall not specifically be restricted, and methods such as, for example, solution polymerization, bulk polymerization, emulsion polymerization, suspension polymerization or the like can be used. In order to turn acryl resins obtained by solution polymerization and bulk polymerization into aqueous emulsions to prepare aqueous dispersions, the resins are emulsified and dispersed by virtue of a mechanical power of a colloid mile and the like under the presence or absence of a solution, and then the residual solvent is removed, if necessary, by distillation under reduced pressure or atmospheric pressure. Use of emulsion polymerization or suspension polymerization makes it possible to directly obtain a polymer in the form of an aqueous emulsion. The preferred form is an aqueous emulsion obtained by emulsion polymerization.

A number average molecular weight of the acryl resin of the present invention is preferably 1000 or more, more preferably 20000 or more. Provided that it is preferably 1000000 or less, more preferably 500000 or less.

When the acryl resin is used, a cross-linkable functional group may be introduced thereinto in order to provide it with a water resistance, a heat resistance, a solvent resistance and a chemical resistance, and a cross-linking agent may further be used in combination. Capable of being used is, for example, a system in which multifunctional carboxylic acid or multifunctional amine is used as a cross-linking agent for copolymers prepared by using monomers having an epoxy group such as glycidyl(meth)acrylate, a system in which multifunctional isocyanate is used for copolymers prepared by using monomers having a hydroxyl group such as 2-hydroxyethyl(meth)acrylate and hydroxybutyl(meth)acrylate or a system in which multifunctional hydrazine such as adipic dihydrazide and sebacic dihydrazide is used for copolymers prepared by using monomers having a carbonyl group such as diacetoneacrylamide and acrolein. Among them, a system cross-linked by a carbonyl group and multifunctional hydrazine is a single liquid type and can be stored, and on the other hand, it can be cured even at ambient temperature and therefore is preferred. The above cross-linkable functional groups are contained in an amount of preferably 0.5 part by mass or more, more preferably 1 part by mass or more based on 100 parts by mass of the acryl resin. Provided that they are contained in an amount of preferably 20 parts by mass or less, more preferably 10 parts by mass or less based on 100 parts by mass of the acryl resin. The higher than the lower limit the amount is, the more easily the satisfactory cross-linking effect is obtained, and the lower than the upper limit the amount is, the more the storage stability and the like tend to be increased.

(b) Polyurethane Resin:

The polyurethane resin used in the present invention is a urethane polymer obtained by reacting a component (i) containing averagely two or more active hydrogens in a molecule with a polyvalent isocyanate component (ii) and a urethane polymer obtained by reacting a chain elongation agent such as diol and the like with an isocyanate group-containing prepolymer obtained by reacting the component (i) with the component (ii) each described above on a condition of excessive isocyanate groups. An acid component (acid residue) may be present in the above urethane polymers. A chain elongation method for the isocyanate group-containing prepolymer can be carried out by a publicly known method. For example, water, water-soluble polyamine and glycols are used as the chain elongation agent, and the isocyanate group-containing prepolymer is reacted with a chain elongation agent component, if necessary, under the presence of a catalyst.

The component (i) containing averagely two or more active hydrogens in a molecule is preferably a component having hydroxyl group-like active hydrogens. It includes, for example, the following compounds.

(1) Diol Compound:

It includes, to be specific, ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol and the like.

(2) Polyether Diol:

It includes alkylene oxide addition products of the diol compounds described above, or ring-opening (co)polymers of alkylene oxides and cyclic ethers (tetrahydrofuran and the like), to be specific, polyethylene glycol, polypropylene glycol, (block or random) copolymers of ethylene glycol and propylene glycol, polytetramethylene glycol, polyhexamethylene glycol, polyoctamethylene glycol and the like.

(3) Polyester Diol:

It includes compounds obtained by subjecting dicarboxylic acids (or anhydrides) such as adipic acid, succinic acid, sebacic acid, glutaric acid, maleic acid, fumaric acid, phthalic acid and the like and the diol compounds listed in (i) described above, such as ethylene glycol, propylene glycol, 1,4-butanediol, 1,6-hexanediol, 1,8-octamethylenediol, neopentyl glycol and the like to polycondensation on a condition of excessive hydroxyl groups.

To be specific, it includes ethylene glycol-adipic acid condensation products, butanediol-adipic acid condensation products, hexamethylene glycol-adipic acid condensation products, ethylene glycol-propylene glycol-adipic acid condensation products, or polylactonediol obtained by subjecting lactone to ring-opening polymerization using glycol as an initiator.

(4) Polyetherester Diol:

It includes compounds obtained by adding ether group-containing diols (polyether diol, diethylene glycol and the like in (2) described above) or mixtures thereof with other glycols to dicarboxylic acids (or anhydrides) shown as examples in (3) described above and then reacting alkylene oxides therewith, for example, polytetramethylene glycol-adipic acid condensation products.

(5) Polycarbonate Diol:

It includes compounds represented by a formula HO—R—(O—C(O)—O—R)$_x$—OH (wherein R represents a saturated fatty acid diol residue having 1 to 12 carbon atoms, and x represents the number of a repetitive unit of a molecule and is usually an integer of 5 to 50). They are obtained by a transesterification method in which saturated aliphatic diol is reacted with substituted carbonate (diethyl carbonate, diphenyl carbonate and the like) on a condition of excessive hydroxyl groups and a method in which the saturated aliphatic diol described above is reacted with phosgene or the reaction product is then further reacted, if necessary, with the saturated aliphatic diol.

The compounds shown as the examples in (1) to (5) can be used alone or in combination of two or more kinds thereof.

Aliphatic, alicyclic or aromatic compounds containing averagely two or more isocyanate groups can be used as the polyvalent isocyanate component (ii) reacted with the component (i) described above. The aliphatic diisocyanate compounds are preferably aliphatic diisocyanates having 1 to 12 carbon atoms and include, for example, hexamethylenediisocyanate, 2,2,4-trimethylhexanediisocyanate and the like. The alicyclic diisocyanate compounds are preferably alicyclic diisocyanates having 4 to 18 carbon atoms and include, for example, 1,4-cyclohexanediisocyanate, methylcyclohexylenediisocyanate and the like. The aromatic diisocyanates include tolylediisocyanate, 4,4'-diphenylmethanediisocyanate, xylylediisocyanate and the like.

A polyurethane resin containing an acid residue can be dispersed in water without using a surfactant or even in a small amount thereof, and therefore the coating film is improved in a water resistance. A content of the acid residue falls suitably in a range of 25 to 150 (mg KOH/g), preferably 30 to 100 (mg KOH/g) in terms of an acid value of the polyurethane resin. If the acid value is less than 25, the water dispersibility is reduced, and therefore a surfactant is preferably used in combination. On the other hand, if the acid value is larger than 150, the coating film tends to be inferior in a water resistance and an adhesive property.

A method for introducing an acid group into the polyurethane resin shall not be restricted, and a carboxyl group can be introduced in advance into polyetherdiols, polyesterdiols, polyetheresterdiols and the like, for example, by substituting a part or all of the glycol components of (2) to (4) described above with dimethylolalkane acids. The specific examples of the dimethylolalkane acids include dimethylolpropionic acid, dimethylolacetic acid, dimethylolbutyric acid and the like.

The polyurethane resin of the present invention has a number average molecular weight of preferably 1000 or more, more preferably 20000 or more. Provided that it is preferably 1000000 or less, more preferably 200000 or less. When an aqueous dispersion of the polyurethane resin is produced, a production process for the same shall not specifically be restricted, and it can be produced according to the production process for the aqueous dispersion of the acryl resin described above.

(c) Polyester Resin:

The polyester resin used in the present invention includes resins obtained by subjecting dicarboxylic acids such as adipic acid, succinic acid, sebacic acid, glutaric acid, maleic acid, fumaric acid, phthalic acid and the like and/or anhydrides thereof and the diol compounds such as ethylene glycol, propylene glycol, 1,4-butanediol, 1,6-hexanediol, 1,8-octamethylenediol, neopentyl glycol and the like or ether group-containing diols (polyethylene glycol, polypropylene glycol, polytetramethylene glycol and the like) to polycondensation.

To be specific, it includes ethylene glycol-adipic acid condensation products, butanediol-adipic acid condensation products, hexamethylene glycol-succinic acid condensation products, ethylene glycol-propylene glycol-phthalic acid condensation products, polyethylene glycol-adipic acid condensation products and the like.

An aqueous dispersion of the polyester resin is obtained by turning the polyester resin described above into an aqueous emulsion under the presence or absence of a surfactant. A production process for the same shall not specifically be restricted, and it can be produced according to the production process for the aqueous dispersion of the acryl resin described above.

The polyester resin of the present invention has a number average molecular weight of preferably 1000 or more, more preferably 5000 or more. Provided that it is preferably 500000 or less, more preferably 10000 or less.

(d) Epoxy Resin:

The epoxy resin used in the present invention shall not specifically be restricted as long as it is a polymer having at least one epoxy group in a molecule. It includes, for example, polyvalent glycidyl ethers of phenol obtained by reacting polyvalent phenols with epichlorohydrin under the presence of an alkali and epoxy group-containing polymers obtained by reacting the above polyvalent glycidyl ethers of phenol with the polyvalent phenols described above.

The polyvalent phenols described above include, for example, bis(4-hydroxyphenyl)-2,2-propane, 4,4'-hydroxybenzophenone, bis(4-hydroxyphenyl)-1,1-ethane, bis(4-hydroxyphenyl)-1,1-isobutane, bis(4-hydroxy-t-butyl-phenyl)-2,2-propane, bis(2-hydroxynaphthl)methane, 1,5-dihydroxynaphthalene and the like. Hydrogenated compounds obtained by adding hydrogens to a part or all of double bonds of the phenyl nuclei in the above polyvalent phenols can be used as well in place of the polyvalent phenols.

Further, polyglycidyl ethers of phenol base novolac resins and polyglycidyl ethers of polyhydric alcohols can also be used as the epoxy resin. The polyhydric alcohols described above include, for example, ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)-2,2-propane, sorbitol and the like.

An aqueous dispersion of the epoxy resin is obtained by turning the epoxy resin described above into an aqueous emulsion under the presence or absence of a surfactant. A production process for the same shall not specifically be restricted, and it can be produced according to the production process for the aqueous dispersion of the acryl resin described above.

The epoxy resin has a number average molecular weight of preferably 1000 or more, more preferably 20000 or more. Provided that it is preferably 1000000 or less, more preferably 200000 or less.

(e) Vinyl Ester Base Resin:

The vinyl ester base resin includes polymers of vinyl esters alone and copolymers including polymers of vinyl ester monomers with other radically polymerizable monomers. The other radically polymerizable monomers include ethylene, (meth)acrylic esters, aromatic vinyls, unsaturated nitriles, acrylamides, (meth)acrylic acid, $\alpha,\beta$-unsaturated dicarboxylic acids and the like.

The vinyl ester monomers include alkyl acid vinyl esters such as vinyl acetate, vinyl propionate, vinyl pivalate, vinyl esters of tertiary carboxylic acids having 8 to 10 carbon atoms and the like, and vinyl acetate is preferred. The vinyl ester base resin is particularly preferably homopolymers of vinyl acetate or ethylene-vinyl acetate copolymers.

A mass ratio of an ethylene unit to a vinyl ester unit in the copolymer falls in a range of preferably 5 to 70 parts by mass, more preferably 10 to 50 parts by mass for the ethylene unit contained in the copolymer based on 100 parts by mass of the vinyl ester unit. If the ethylene unit is less than 5 parts by mass, the initial adhesive property and the water resistance are reduced, and if it is more than 70 parts by mass, the adhesive strength tends to be reduced.

An emulsion of the copolymer can be produced usually by emulsion-polymerizing the monomers constituting the ethylene unit and the vinyl ester unit each described above. Water-soluble high polymer compounds such as hydroxymethyl cellulose, carboxymethyl cellulose and the like and protective colloids such as partially or completely saponified polyvinyl acetate base emulsifiers and the like can be used as an emulsifier used in the emulsion polymerization described above.

A molecular weight of the vinyl ester base resin is preferably 100 to 3000 in terms of an average polymerization degree, and an average saponification degree thereof is preferably a proportion of 80 to 98 mole %.

Pigment:

The aqueous dispersion of the present invention can be used as a coating material by adding a pigment. The specific examples of the pigment include color pigments including inorganic pigments such as titanium oxide, carbon blacks, iron oxide, chromium oxide, iron blue, red iron oxide, chrome yellow, yellow iron oxide and the like and organic pigments such as azo base pigments, anthracene base pigments, perinone base pigments, perylene base pigments, quinacridone base pigments, isoindolinone base pigments, indigo base pigments, phthalocyanine base pigments and the like; extender pigments such as talc, calcium carbonate, clay, kaolin, silica, precipitated barium sulfate and the like; conductive pigments such as conductive carbon, whiskers of antimony dope on which tin oxide is coated and the like; non-colored or colored metal-made bright materials of metals such as aluminum, copper, zinc, nickel, tin, aluminum oxide and the like or alloys thereof.

In dispersing the pigment, a pigment dispersant may be used. Capable of being listed are, for example, water-based acryl resins such as JONCRYL RESIN manufactured by Johnson Polymer Corp.; acid block copolymers such as BYK-190 manufactured by BYK A.G.; styrene-maleic acid copolymers; acetylenediol derivatives such as Surfynol T324 manufactured by Air Products Inc.; and water-soluble carboxymethyl acetate butyrate such as CMCAB-641-0.5 manufactured by Eastman Chemical Company. Use of the above pigment dispersants makes it possible to prepare a stable pigment paste.

Publicly known methods can be used as a method for dispersing the pigment. For example, a pigment, water, a pigment dispersant, a thickener, a defoaming agent and the like are mixed in advance to prepare a pigment base, and then this pigment base is mixed with the aqueous resin dispersion. A freeze melt stabilizer, a film-forming auxiliary agent, an antiseptic agent, an anti-mold agent and the like may be blended if necessary. Alternatively, the pigment, water, the aqueous resin dispersion and the other additives described above may be mixed at the same time. A mixing equipment such as a dissolver, a homogenizer, a homomixer and the like or a dispersing equipment such as a paint shaker, a ball mill, a sand mill, an attractor, a roll mill, a kneader and the like can be used for mixing.

An amount of the pigment in the aqueous dispersion is preferably 10 parts by mass or more based on 100 parts by mass of the resin component. It is more preferably 50 parts by mass or more. Provided that it is preferably 400 parts by mass or less, more preferably 200 parts by mass or less. The higher than the lower limit the addition amount is, the higher the color developability and the masking property tend to be, and the lower than the upper limit the addition amount is, the higher the adhesive property, the moisture resistance and the oil resistance tend to be.

Basic Substance:

In the aqueous dispersion of the present invention, a basic substance can be added in order to enhance a dispersion stability of the dispersed particles. The basic substance includes inorganic basic substances such as sodium hydroxide, potassium hydroxide, sodium carbonate and the like, ammonia and amines such as methylamine, dimethylamine, trimethylamine, diethylamine, ethanolamine, diethylethanolamine, triethanolamine, 2-ethyl-2-aminopropanol and the like, and among them, the amines are preferred. The basic substance is used in an amount of 0.01 to 10 parts by mass, preferably 0.1 to 5 parts by mass based on 100 parts by mass of the graft copolymer.

Acidic Substance:

In the aqueous dispersion of the present invention, an acidic substance can be added if necessary. The acidic substance includes, for example, inorganic acids such as hydrochloric acid, sulfuric acid and the like and organic acids such as acetic acid and the like. The acidic substance is used in an amount of 0.01 to 10 parts by mass, preferably 0.1 to 5 parts by mass based on 100 parts by mass of the graft copolymer.

Polyolefin:

The graft copolymer of the present invention can be used in order to accelerate dispersion of the polyolefin. The specific examples of the polyolefin include high pressure process polyethylene, high pressure process polyethylene base copolymers such as ethylene vinyl acetate copolymers, ethylene ethyl acrylate copolymers, ethylene methyl methacrylate copolymers and the like; polypropylene base polymers such as polypropylene, random polypropylene, block polypropylene and the like; and poly-α-olefin base polymers such as poly(4-methylpentene-1), polybutene-1, polyoctene-1 and polymers or copolymers of α-olefins having 10 to 28 carbon atoms.

Among the polymers described above, the polypropylene base polymers or the polymers of polybutene-1 are preferred. The polyolefins having a stereoregularity [mmmm] falling in a range of 30 to 99 mole % are preferred, and [mmmm] thereof falls more preferably in a range of 30 to 80 mole %. As described above, the polypropylene base polymers having [mmmm] falling in a range of 30 to 80 mole % are most preferred.

A use amount of the polyolefin is preferably 10 to 1000 parts by mass based on 100 parts by mass of the graft copolymer.

The method (a) and the method (b) each explained in the method for dispersing the graft copolymer can be used as a method for dispersing the polyolefin. Provided that 100 to 1000 parts by mass of water based on 100 parts by mass of the polyolefin is preferably added.

Other Additives:

Various additives can be added, if necessary, as long as the effects are not notably damaged. Allowed to be blended are, for example, various additives including various stabilizers such as UV absorbers, antioxidants, antiweatherability stabilizers, heat resistant agents and the like; conductivity-providing agents such as carbon black, ferrite and the like, dyes, pigment dispersants, leveling agents, defoaming agents, thickeners, preservatives, anti-mold agents, rust preventives, wetting agents and the like.

Further, in order to further enhance various coating film performances such as a water resistance, a solvent resistance and the like, a cross-linking agent can be added in an amount of 0.01 to 100 parts by mass based on 100 parts by mass of the resin component in the graft copolymer. Cross-linking agents having a self cross-linking property, compounds having plural functional groups reacting with a carboxyl group in a molecule, metal complexes having a polyvalent coordinate and the like can be used as the cross-linking agent. Among them, isocyanate compounds, melamine compounds, urea compounds, epoxy compounds, carbodiimide compounds, oxazoline group-containing compounds, zirconium salt compounds, silane coupling agents and the like are preferred. Further, the above cross-linking agents may be used in combination.

When the aqueous dispersion of the present invention is used for applications such as primers, coating materials and the like, a hydrophilic organic solvent other than water can be blended for the purpose of enhancing the drying speed or obtaining the surface having a good finish feeling. The hydrophilic organic solvent includes alcohols such as methanol, ethanol and the like, ketones such as acetone and the like, glycols such as ethylene glycol, propylene glycol and the like and ethers thereof, N-methylpyrrolidone and the like. It is preferably isopropanol, ethanol, propylene glycol monomethyl ether, ethylene glycol monobutyl ether and N-methylpyrrolidone. A content thereof is usually 20% by mass or less, preferably 10% by mass or less and more preferably 5% by mass or less based on a total amount of water and the above hydrophilic organic solvent.

Applications of the Aqueous Dispersion:

The aqueous dispersion of the present invention can preferably be used in coating agents, coating materials, inks or adhesives. In the above applications, the aqueous dispersion of the present invention is coated on a base material, and a resin layer is formed on the base material by drying treatment, whereby a double layer matter is obtained. The base material includes resins, metals, ceramics, wood, glass and the like, and any resin of crystalline polypropylene, crystalline block polypropylene and crystalline propylene random copolymers is particularly preferred. A side chain of the graft copolymer used in the present invention is a long polyolefin chain having a specific stereoregularity and therefore has a high affinity to the above resins, and the excellent adhesive property, strength and the like are obtained.

In applications other than described above, the aqueous dispersion can be used as a binder agent for glass fibers, organic fibers, inorganic fibers and the like and a surface treating agent for fillers, pigment surface, film surface and the like. In the case of the above applications, the preferred coating amount is 0.1 to 10% by mass.

EXAMPLES

Next, the present invention shall be explained in further details with reference to examples, but the present invention shall by no means be restricted by these examples.

Production Example 1

Production of Reactive Polypropylene (1) Synthesis of Metal Complex (1,2'-Dimethylsilylene)(2,1'-dimethylsilylene)-bis(3-trimethylsilylmethylindenyl)zirconium dichloride was synthesized in the following manner.

A lithium salt 3.0 g (6.97 mmol) of (1,2'-dimethylsilylene)(2,1'-dimethylsilylene)-bis(indene) was dissolved in 50 ml of THF (tetrahydrofuran) in a Schlenk bottle, and the solution was cooled down to −78° C. Iodomethyltrimethylsilane 2.1 ml (14.2 mmol) was slowly dropwise added thereto and stirred at room temperature for 12 hours.

The solvent was removed by distillation, and 50 ml of ether was added thereto, followed by washing the solution with a saturated ammonium chloride solution. After separating the solution, the organic phase was dried, and the solvent was removed, whereby 3.04 g (5.88 mmol) of (1,2'-dimethylsilylene)(2,1'-dimethylsilylene)-bis(3-trimethylsilylmethylindene) was obtained (yield: 84%).

Next, a Schlenk bottle was charged with 3.04 g (5.88 mmol) of (1,2'-dimethylsilylene)(2,1'-dimethylsilylene)-bis(3-trimethylsilylmethylindene) obtained above and 50 ml of ether under nitrogen flow. The solution was cooled down to −78° C., and a hexane solution (1.54M, 7.6 ml (1.7 mmol)) of n-BuLi was dropwise added thereto. The solution was heated up to room temperature and stirred for 12 hours, and then ether was removed by distillation. The resulting solid matter was washed with 40 ml of hexane, whereby 3.06 g (5.07 mmol) of the lithium salt was obtained in the form of an ether-added product (yield: 73%).

The results obtained by measurement by means of $^1$H-NMR (90 MHz, THF-$d^8$) are shown below.

δ: 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2 to 7.7 (m, 8H, Ar—H).

The lithium salt obtained above was dissolved in 50 ml of toluene under nitrogen flow. The solution was cooled down to −78° C., and a toluene (20 ml) suspension of 1.2 g (5.1 mmol) of zirconium tetrachloride which was cooled in advance to −78° C. was dropwise added thereto. After dropwise adding, the solution was stirred at room temperature for 6 hours, and then the solvent was removed from the reaction solution by distillation. The resulting residue was recrystallized from dichloromethane, whereby 0.9 g (1.33 mmol) of (1,2'-dimethylsilylene)(2,1'-dimethylsilylene)-bis(3-trimethylsilylmethylindenyl)zirconium dichloride was obtained (yield: 26%).

The results obtained by measurement by means of $^1$H-NMR (90 MHz, CDCl$_3$) are shown below.

δ: 0.0 (s, 18H, trimethylsilyl), 1.02, 1.12 (s, 12H, dimethylsilylene), 2.51 (dd, 4H, methylene), 7.1 to 7.6 (m, 8H, Ar—H).

(2) Polymerization of Propylene

A stainless steel-made autoclave having a content volume of 1.4 L which was dried by heating was charged with 0.4 L of dry heptane and 1.5 ml of a heptane solution containing 1.5 mmol of triisobutylaluminum, and the mixture was stirred for 10 minutes. Next, 2 ml of a heptane slurry containing 1.5 μmol of methylanilinium tetrakis(perfluorophenyl)borate was added thereto, and 0.5 ml of a heptane slurry containing 1.5 μmol of (1,2'-dimethylsilylene)(2,1'-dimethylsilylene)-bis(3-trimethylsilylmethylindenyl)zirconium dichloride prepared in (1) described above was added thereto. Hydrogen 100 ml was weighed at room temperature (25° C.) and charged into the autoclave.

Next, the temperature was elevated up to 80° C. while stirring, and propylene gas was introduced thereinto up to 0.5 MPa in terms of a partial pressure. The propylene gas was supplied by means of a pressure governor during the polymerization reaction so that the pressure was maintained at a fixed level to polymerize propylene for 40 minutes. Then, the reaction solution was cooled down to remove unreacted propylene by depressurization, and the content was taken out. The content was dried in air and then further dried at 80° C. under reduced pressure for 8 hours to thereby obtain 189.5 g of polypropylene. The polymerization evaluation results thereof are shown in Table 1.

Production Example 2

Production of Reactive Polypropylene

Propylene was polymerized in the same manner, except that in the polymerization of propylene of Production Example 1, hydrogen was not used and that changed were the temperature to 70° C., the propylene partial pressure to 0.55 MPa and the polymerization time to 47 minutes. As a result thereof, 83.4 g of polypropylene was obtained. The polymerization evaluation results thereof are shown in Table 1.

Production Example 3

Production of Reactive Polypropylene (1) Synthesis of Metal Complex (1,2'-Dimethylsilylene)(2,1'-dimethylsilylene)-(3-trimethylsilylmethylindenyl)(indenyl)zirconium dichloride was synthesized in the following manner.

A Schlenk bottle of 200 ml was charged with 50 ml of ether and 3.5 g (10.2 mmol) of (1,2'-dimethylsilylene)(2,1'-dimethylsilylene)bisindene under nitrogen flow, and a hexane solution (1.60 mole/liter, 12.8 ml) of n-butyllithium (n-BuLi) was dropwise added thereto at −78° C. The mixture was stirred at room temperature for 8 hours, and then the solvent was removed, followed by drying the resulting solid matter under reduced pressure, whereby 5.0 g of a white solid matter was obtained. This solid matter was dissolved in 50 ml of tetrahydrofuran (THF), and 1.4 ml of iodomethyltrimethylsilane was dropwise added thereto at room temperature. Hydrolysis was carried out by adding 10 ml of water, and the organic phase was extracted with 50 ml of ether. Then, the organic phase was dried, and the solvent was removed by distillation. Ether 50 ml was added thereto, and a hexane solution (1.60 mole/liter, 12.4 ml) of n-BuLi was dropwise added thereto at −78° C. Then, the solution was heated up to room temperature and stirred for 3 hours, and then ether was removed by distillation. The resulting solid matter was washed with 30 ml of hexane and then dried under reduced pressure. The above white solid matter 5.11 g was dispersed in 50 ml of toluene, and 2.0 g (8.60 mmol) of zirconium tetrachloride dispersed in 10 ml of toluene in a different Schlenk bottle was added thereto. The mixture was stirred at room temperature for 12 hours, and then the solvent was removed by distillation. The residue was washed with 50 ml of hexane and then recrystallized from 30 ml of dichloromethane, whereby 1.2 g of a yellow fine crystal was obtained (yield: 25%).

(2) Polymerization of Propylene

A stainless steel-made autoclave having a content volume of 5 L which was dried by heating was charged with 2.5 L of dry heptane, 1.4 ml of a heptane solution containing 1.4 mmol of triisobutylaluminum and 2 ml of a heptane slurry containing 15.4 μmol of methylanilinium tetrakis(perfluorophenyl)borate, and the mixture was stirred for 10 minutes while controlling the temperature to 50° C.

Further, added thereto was 6 ml of a heptane slurry containing 3.8 μmol of (1,2'-dimethylsilylene)(2,1'-dimethylsilylene)-(3-trimethylsilylmethylindenyl)-(indenyl)zirconium dichloride which was the transition metal compound complex prepared in (1) described above.

Further, 5 ml of hydrogen was introduced thereinto, and then the temperature was elevated up to 60° C. while stirring, followed by introducing propylene gas up to 0.49 MPa in terms of a partial pressure.

The propylene gas was supplied by means of a pressure governor during the polymerization reaction so that the pressure was maintained at a fixed level to polymerize propylene for 100 minutes. Then, the reaction solution was cooled down to remove unreacted propylene by depressurization, and the content was taken out.

The content was dried in air and then further dried at 80° C. under reduced pressure for 8 hours to thereby obtain 1100 g of polypropylene. The polymerization evaluation results thereof are shown in Table 1.

Comparative Production Example 1

Production of End Saturated Polypropylene

A stainless steel-made autoclave having a content volume of 1 L which was dried by heating was charged with 400 ml of dry heptane and 2.0 mmol of methylaluminoxane under nitrogen atmosphere, and the mixture was stirred for 10 minutes while controlling the temperature to 50° C.

Further, added thereto was 0.6 ml of a heptane slurry containing 0.6 μmol of (1,2'-dimethylsilylene)(2,1'-dimethylsilylene)-(3-trimethylsilylmethylindenyl)-(indenyl)zirconium dichloride which was the transition metal compound complex prepared in (1) of Production Example 3. Further, hydrogen was introduced thereinto at a pressure of 0.01 MPa, and then the temperature was elevated up to 60° C. while stirring, followed by introducing propylene to polymerize propylene for 60 minutes at a full pressure of 0.8 MPa. After finishing the reaction, the reaction solution was cooled down to remove unreacted propylene by depressurization, and the content was taken out.

The content was dried in air and then further dried at 80° C. under reduced pressure for 8 hours to thereby obtain 83 g of end saturated polypropylene. The results thereof are shown in Table 1.

TABLE 1

|  | Production Example | | | Comparative Production Example |
|---|---|---|---|---|
|  | 1 | 2 | 3 | 1 |
| Number of end vinylidene group (group/molecule) | 0.98 | 0.92 | 0.97 | nd |
| Stereoregularity mmmm (%) | 41.5 | 42.5 | 57.4 | 57.0 |
| Weight average molecular weight | 37200 | 101000 | 46200 | 67100 |
| Molecular weight distribution Mw/Mn | 1.75 | 2.12 | 1.84 | 1.75 |
| Melting point (° C.) | 70.5 | 71.0 | 98.6 | 98.6 |

Production Example 4

Production of Graft Copolymer

A separable flask equipped with a stirring device was charged with 30 g of the reactive polypropylene synthesized in Production Example 1 and 20 ml of dehydrated toluene under nitrogen atmosphere, and it was dissolved at a temperature of 80° C. while stirring. α,α'-Azobisisobutyronitrile (AIBN) 19 mg was added thereto, and 5.0 g of acrylic acid was added thereto in 45 minutes. After finishing addition, they were reacted for 1 hour. Then, 19 mg of α,α'-azobisisobutyronitrile (AIBN) was further added thereto, and 5.0 g of acrylic acid was added thereto in 60 minutes. Then, they were reacted for 4 hours. After finishing the reaction, the reaction mixture was transferred into a Teflon (registered trade name)-coated bat and dried in air, and then it was dried at 90° C. under vacuum for 24 hours. As a result thereof, 39.8 g of a graft copolymer was obtained.

The weight average molecular weight (Mw) and the molecular weight distribution (Mw/Mn) were measured by the GPC method described above.

The graft rate was determined in the following manner. That is, 1.0 g of the dried polymer was dissolved in 8 ml of toluene, and the solution was added to 50 ml of ethanol to obtain a dispersion. This was subjected to solid-liquid separation by means of a centrifugal separator (21000 rpm, 30 minutes) to recover the solid part. Further, the solid part was dispersed in ethanol and extracted at room temperature for 2 hours, and then the dispersion was subjected to centrifugal separation in the same manner to recover the solid part. This was dried to recover the polymer. The graft rate was calculated in the following manner from a mass (W2) of the solvent-insoluble polymer and a mass (W1) of the reactive polypropylene used as the raw material.

graft rate (% by mass)=($W2-W1$)/$W1\times100$

The result thereof is shown in Table 2.

Further, the polymer contained in the liquid part was measured by NMR to find that chains originating in polypropylene of the raw material were detected, and therefore it was shown that the graft matter was present as well in the dissolved part.

Production Example 5

Production of Graft Copolymer

A graft copolymer was produced in the same manner, except that in Production Example 4, the reactive polypropylene synthesized in Production Example 2 was used. The results thereof are shown in Table 2.

Production Example 6

Production of Graft Copolymer

A graft copolymer was produced in the same manner, except that in Production Example 4, the reactive polypropylene synthesized in Production Example 3 was used. The results thereof are shown in Table 2.

TABLE 2

| | Production Example | | |
|---|---|---|---|
| | 4 | 5 | 6 |
| Yield (g) | 39.9 | 39.8 | 39.7 |
| Weight average molecular weight | 39200 | 111000 | 47600 |
| Molecular weight distribution Mw/Mn | 1.77 | 1.95 | 1.76 |
| Graft rate (%) | 19.2 | 15.0 | 18.2 |

Production Example 7

Production of Graft Copolymer

A separable flask equipped with a stirring device was charged with 30 g of the reactive polypropylene synthesized in Production Example 3 and 37 ml of dehydrated toluene under nitrogen atmosphere, and it was dissolved at a temperature of 70° C. while stirring. Maleic anhydride 4.7 g and 1-decene 6.93 g were added and dissolved therein. A solution prepared by dissolving 0.31 g of α,α'-azobisisobutyronitrile (AIBN) in 15 ml of dehydrated toluene was added thereto in one hour. After finishing addition, they were reacted for 6 hours. After finishing the reaction, the solvent toluene was removed under reduced pressure, and then the residue was dried at 100° C. under reduced pressure for 24 hours.

The weight average molecular weight (Mw) and the molecular weight distribution (Mw/Mn) were measured by the GPC method described above.

The graft rate was determined in the following manner. That is, the dried polymer was finely dispersed in methyl ethyl ketone and extracted at room temperature for 2 hours while stirring, and then the liquid part was recovered by means of a centrifugal separator (21000 rpm, 15 minutes). The solid part was subjected repeatedly twice to separation by extraction, and it was dried to recover the polymer. The graft rate was calculated in the following manner from a mass (W2) of the solvent-insoluble polymer and a mass (W1) of the reactive polypropylene used as the raw material.

graft rate (% by mass)=($W2-W1$)/$W1\times100$

The result thereof is shown in Table 3.

Further, the polymer contained in the liquid part was measured by NMR to find that chains originating in polypropylene of the raw material were detected, and therefore it was shown that the graft matter was present as well in the dissolved part.

The contents of the monomer units other than 1-decene in Table 3 were calculated from absorptions originating in a carbonyl group by an infrared absorption spectral analytical method, and a content of 1-decene was calculated by NMR analysis.

Production Example 8

Production of Graft Copolymer

A graft copolymer was produced in the same manner, except that in Production Example 7, 4.3 g of vinyl acetate was used in place of 1-decene. The results thereof are shown in Table 3.

Production Example 9

Production of Graft Copolymer

A graft copolymer was produced in the same manner, except that in Production Example 7, 3.6 g of acrylic acid was used in place of 1-decene. The results thereof are shown in Table 3.

TABLE 3

| | Production Example | | |
|---|---|---|---|
| | 7 | 8 | 9 |
| Yield (g) | 37.1 | 38.8 | 38.2 |
| Maleic anhydride unit content (mass %) | 7.8 | 11.8 | 12.1 |
| 1-Decene unit content (mass %) | 11.4 | — | — |
| Vinyl acetate unit content (mass %) | — | 10.8 | — |
| Acrylic acid unit content (mass %) | — | — | 9.2 |
| Weight average molecular weight | 52290 | 49930 | 51500 |
| Molecular weight distribution Mw/Mn | 1.84 | 1.80 | 1.80 |
| Graft rate (%) | 16.8 | 21.5 | 20.6 |

Production Example 10

Production of Graft Copolymer

A separable flask equipped with a stirring device was charged with 30 g of the reactive polypropylene synthesized in Production Example 1 and 130 ml of dehydrated toluene under nitrogen atmosphere, and it was dissolved at a temperature of 80° C. while stirring. Acrylic acid 5.0 g and polyethylene glycol monoacrylate (n≈10) 7.0 g were added thereto, and 15 ml of a toluene solution containing 0.5 g of α,α'-azobisisobutyronitrile (AIBN) was dropwise added thereto in one hour. Then, they were reacted for 8 hours. After finishing the reaction, the reaction mixture was transferred into a Teflon (registered trade name)-coated bat and dried in air, and then it was dried at 90° C. under vacuum for 24 hours. As a result thereof, 41.8 g of a graft copolymer was obtained. It had an acrylic acid content of 11.7 wt %, a polyethylene glycol monoacrylate content of 16.4 wt %, a weight average molecular weight (Mw) of 40500, a molecular weight distribution (Mw/Mn) of 2.02 and a graft rate of 37.5%.

Production Example 11

Production of Graft Copolymer

A graft copolymer 41.2 g was obtained in the same manner as in Production Example 10, except that in Production Example 10, 7 g of polypropylene glycol monoacrylate (n 9) was used in place of polyethylene glycol monoacrylate (n 10). It had an acrylic acid content of 10.1 wt %, a polypropylene glycol monoacrylate content of 17.0 wt %, a weight average molecular weight (Mw) of 41000, a molecular weight distribution (Mw/Mn) of 2.10 and a graft rate of 36.0%.

Production Example 12

Production of Graft Copolymer

A graft copolymer 41.7 g was obtained in the same manner as in Production Example 10, except that in Production Example 10, methoxyethylene glycol methacrylate (n=9) was used in place of polyethylene glycol monoacrylate (n 10). It had an acrylic acid content of 12.0 wt %, a methoxyethylene glycol methacrylate content of 16.8 wt %, a weight average molecular weight (Mw) of 41200, a molecular weight distribution (Mw/Mn) of 2.00 and a graft rate of 42%.

Comparative Production Example 2

Acrylic acid-modified polypropylene was tried to be produced in the same manner, except that in Production Example 4, 30 g of polypropylene produced in Comparative Production Example 1 was used in place of the reactive polypropylene synthesized in Production Example 1. It was washed with ethanol to recover an insoluble matter, and it was almost raw material polypropylene to find that graft polymerization was scarcely advanced and that the reaction mixture was a mixture of raw material polypropylene and polyacrylic acid.

Example 1

THF 80 g was added to 20 g of the graft copolymer produced in Production Example 4 to dissolve it completely at 65° C. Purified water 100 g was dropwise added thereto at the above temperature in one hour. The above solution was cooled down to 40° C., and the vacuum degree was reduced gradually from 0.03 MPa to 0.0045 MPa to remove THF and water by distillation under reduced pressure until the concentration reached 25% by mass, whereby an aqueous dispersion was obtained. A diameter of the dispersed particles was measured to result in finding that the 50% particle diameter was 0.13 μm. The molecular particle diameter was determined by means of Mastersizer 2000 manufactured by Malvern Instruments Ltd. as a measuring equipment setting a refractive index of the dispersed particles to 1.59 and a refractive index of the dispersing medium to 1.33.

Example 2

An aqueous dispersion was prepared in the same manner, except that in Example 1, the graft copolymer produced in Production Example 5 was used in place of the graft copolymer produced in Production Example 4. A diameter of the dispersed particles was measured to result in finding that the 50% particle diameter was 0.14 μm.

Example 3

An aqueous dispersion was prepared in the same manner, except that in Example 1, the graft copolymer produced in Production Example 6 was used in place of the graft copolymer produced in Production Example 4. A diameter of the dispersed particles was measured to result in finding that the 50% particle diameter was 0.11 μm.

Example 4

An aqueous dispersion was prepared in the same manner, except that in Example 1, the graft copolymer produced in Production Example 7 was used in place of the graft copolymer produced in Production Example 4. A diameter of the dispersed particles was measured to result in finding that the 50% particle diameter was 0.23 μm.

Example 5

An aqueous dispersion was prepared in the same manner, except that in Example 1, the graft copolymer produced in Production Example 8 was used in place of the graft copolymer produced in Production Example 4. A diameter of the dispersed particles was measured to result in finding that the 50% particle diameter was 0.19 μm.

Example 6

An aqueous dispersion was prepared in the same manner, except that in Example 1, the graft copolymer produced in Production Example 9 was used in place of the graft copolymer produced in Production Example 4. A diameter of the dispersed particles was measured to result in finding that the 50% particle diameter was 0.15 μm.

Example 7

THF 80 g was added to 10 g of the graft copolymer produced in Production Example 4 and 10 g of polypropylene synthesized in Comparative Production Example 1 to dissolve them completely at 65° C. Purified water 100 g was dropwise added thereto at the above temperature in one hour. The above solution was cooled down to 40° C., and the vacuum degree was reduced gradually from 0.03 MPa to 0.0045 MPa to remove THF and water by distillation under reduced pressure until the concentration reached 25% by mass, whereby an aqueous dispersion was obtained. A diameter of the dispersed particles was measured to result in finding that the 50% particle diameter was 3.3 μm.

Example 8

An aqueous dispersion was prepared in the same manner, except that in Example 7, 18 g of the graft copolymer produced in Production Example 4 and 2 g of polypropylene synthesized in Comparative Production Example 1 were used. A diameter of the dispersed particles was measured to result in finding that the 50% particle diameter was 0.17 μm.

Example 9

An aqueous dispersion was prepared in the same manner, except that in Example 1, the graft copolymer produced in Production Example 4 was changed to the graft copolymer produced in Production Example 10. The aqueous dispersion was translucent, and a diameter of the dispersed particles was measured to result in finding that the 50% particle diameter was 0.095 µm.

Example 10

An aqueous dispersion was prepared in the same manner, except that in Example 1, the graft copolymer produced in Production Example 4 was changed to the graft copolymer produced in Production Example 11. The aqueous dispersion was translucent, and a diameter of the dispersed particles was measured to result in finding that the 50% particle diameter was 0.085 µm.

Comparative Example 1

A commercial maleic anhydride radical-modified product of polypropylene (maleic anhydride content: 4.2 wt %, weight average molecular weight (Mw): 20600, mmmm=84 mole %) 10 g was dissolved in 40 g of toluene at 65° C., and then 40 g of THF/water (1/1 volume ratio) 40 g was added thereto in one hour. A solid matter was produced at a stage where dropwise adding was finished, and a dispersion could not be formed.

Comparative Example 2

An aqueous dispersion was produced in the same manner, except that in Example 1, the reaction mixture produced in Comparative Production Example 2 was used in place of the graft copolymer produced in Production Example 4. An aggregate was formed at a stage where purified water was added, and it was flocculated in an upper part of the dispersion.

Example 11

Treatment of Glass Fibers

Glass fibers (E-glass fibers) (specific gravity: 2.55 g/cm$^3$) having a diameter of 17 µm which were treated in advance by a silane coupling agent (3-aminopropyltriethoxysilane) were dipped in the aqueous dispersion produced in Example 4 at room temperature for 60 seconds, and then they were dried by heating to produce surface-treated glass fibers. A treating amount of the modifying agent was determined from the weights of the glass fibers before and after treated to result in finding that it was 0.5 wt % based on the glass fibers.

Example 12

Treatment of Cellulose Fibers

The aqueous dispersion 0.4 g (graft copolymer: 0.1 g) produced in Example 4 was added to 10 g of cut fibers (1.7 dtex, 0.3 mm) of dried cellulose fibers (trade name: Tencel) manufactured by Acordis Inc., and the mixture was stirred and dispersed at room temperature for one hour. This was dried at 80° C. under nitrogen flow and then further dried under vacuum for 5 hours to produce surface-treated cellulose fibers.

Example 13

Evaluation of Adhesive Performance

The aqueous dispersion produced in Example 5 was used as an adhesive to carry out an adhesion test of polypropylene to an aluminum plate. The adhesion test was carried out according to the following method, and the result thereof is shown in Table 4.
(1) Adhesion Base Material:
Polypropylene sheet: Superpurelay SG-140TC, thickness: 0.3 mm, manufactured by Idemitsu Unitec Co., Ltd.
Aluminum plate: commercial product having a thickness of 0.1 mm was washed with acetone.
(2) Preparation of Test Piece:
An adhesion base material was cut out in a width of 25 mm and a length of 100 mm. The aqueous dispersion produced in Example 5 was coated on the polypropylene sheet in an amount of 0.04 g/7.5 cm$^2$ in terms of the solid component and sufficiently dried. The above coated surface and the aluminum plate were put together and pressed at 130° C. and a pressure of 0.5 MPa for 50 seconds by means of a hot press. Then, the plate was lightly interposed between cooling presses of 25° C. and cooled down to room temperature.
(3) Measurement of Adhesive Strength:
A T peel test was carried out at a tensile speed of 50 mm/minute. An autograph DSC-200, manufactured by Shimadzu Corporation was used for the measurement to determine the peel adhesive strength from the maximum stress. Also, an average of the measured values of the three test pieces was used for the measured value.

Example 14

The same adhesion test as in Example 13 was carried out, except that the aqueous dispersion produced in Example 6 was used in place of the aqueous dispersion produced in Example 5. The result thereof is shown in Table 4.

Comparative Example 3

The reaction mixture obtained in Comparative Production Example 2 was subjected to hot press treatment to thereby prepare a sheet having a thickness of 0.1 mm, and this sheet was cut out in 2.5 cm×3 cm. The above sheet was interposed between the polypropylene sheet and the aluminum plate each shown in Example 13 (1) and subjected to hot press treatment on the conditions described in Example 13 (2) to thereby prepare an adhesion test piece, and the adhesion strength was measured. The result thereof is shown in Table 4.

Comparative Example 4

The commercial modified polypropylene used in Comparative Example 1 was used to measure the adhesive strength in the same manner as in Comparative Example 3. The result thereof is shown in Table 4.

TABLE 4

|  | Example | | Comparative Example | |
| --- | --- | --- | --- | --- |
|  | 13 | 14 | 3 | 4 |
| Adhesive strength (N/25 mm) | 49.8 | 40.1 | 17.0 | 17.6 |

Example 15

An aqueous dispersion was prepared in the same manner, except that in Example 1, the graft copolymer produced in Production Example 4 was changed to the graft copolymer produced in Production Example 12. As a result thereof, the 50% particle diameter was 0.090 μm.

Example 16

The end saturated polypropylene produced in Comparative Production Example 1 and the graft copolymer produced in Production Example 9 were used in an amount ratio shown in Table 5 to produce an aqueous dispersion according to Example 1. The above aqueous dispersion was used to measure an adhesive strength between polypropylene and aluminum. The result thereof is shown in Table 5.

TABLE 5

|  | Example | |
| --- | --- | --- |
|  | 16-1 | 16-2 |
| End-saturated polypropylene (Comparative Production Example 1) (g) | 5 | 10 |
| Graft copolymer (Production Example 9) (g) | 15 | 10 |
| Adhesive strength (N/25 mm) | 50.5 | 60.0 |

INDUSTRIAL APPLICABILITY

According to the present invention, provided is an aqueous dispersion containing a graft copolymer which shows an excellent dispersibility even in a state of reducing a surfactant and which is excellent in an affinity with a binder resin, a pigment and the like. The aqueous dispersion of the present invention is useful as a component for coating materials and adhesives.

The invention claimed is:

1. An aqueous dispersion containing a graft copolymer satisfying (a) to (e) shown below and water:
    (a) a graft rate is 1 to 150% by mass,
    (b) a weight average molecular weight measured by GPC is 500 to 400000,
    (c) a molecular weight distribution (Mw/Mn) is 1.5 to 4,
    (d) a main chain is a polymerization chain containing a monomer unit having a hydrophilic group and
    (e) a side chain is a homopolymerization chain of a single kind or a copolymerization chain of two or more kinds selected from α-olefins having 3 to 28 carbon atoms or a copolymerization chain comprising an α-olefin unit having 3 to 28 carbon atoms and an ethylene unit which accounts for 50% by mass or less, wherein a mesopentad ratio [mmmm] of the polymerization chain is 30 to 80 mole %.

2. The aqueous dispersion according to claim 1, wherein the graft copolymer is formed by copolymerization reaction of a reactive polyolefin satisfying (A) to (C) shown below with the monomer forming the main chain of the graft copolymer:
    (A) an amount of an end unsaturated group per molecule is 0.5 to 1.0 group,
    (B) a mesopentad ratio [mmmm] is 30 to 80 mole % and
    (C) a homopolymer of a single kind or a copolymer of two or more kinds selected from α-olefins having 3 to 28 carbon atoms or a copolymer comprising α-olefin having 3 to 28 carbon atoms and ethylene which accounts for 50% by mass or less.

3. The aqueous dispersion according to claim 2, wherein the reactive polyolefin is produced under the presence of a metallocene catalyst.

4. The aqueous dispersion according to claim 3, wherein the metallocene catalyst is a di-cross-linked complex represented by Formula (I):

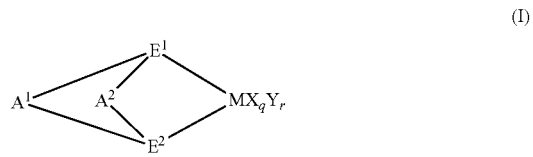

wherein M represents a metal element of a 3rd to 10th group in the periodic table; $E^1$ and $E^2$ each represent a ligand selected from the group consisting of a cyclopentadienyl group, a substituted cyclopentadienyl group, an indenyl group, a substituted indenyl group, a heterocyclopentadienyl group, a substituted heterocyclopentadienyl group, an amide group, a phosphine group, a hydrocarbon group and a silicon-containing group, and $E^1$ and $E^2$ form a cross-linking structure via $A^1$ and $A^2$; $E^1$ and $E^2$ may be the same as or different from each other, and at least one of $E^1$ and $E^2$ is a cyclopentadienyl group, a substituted cyclopentadienyl group, an indenyl group or a substituted indenyl group; X represents a σ-bonding ligand, and when a plurality of X is present, plural X may be the same or different and may be cross-linked with other X, $E^1$, $E^2$ or Y; Y represents a Lewis base, and when a plurality of Y is present, plural Y may be the same or different and may be cross-linked with other Y, $E^1$, $E^2$ or X; $A^1$ and $A^2$ are divalent cross-linking groups which bond two ligands and represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, and $R^1$ represents a hydrogen atom, a halogen atom, a hydrocarbon group having 1 to 20 carbon atoms or a halogen-containing hydrocarbon group having 1 to 20 carbon atoms, and $A^1$ and $A^2$ may be the same as or different from each other; q is an integer of 1 to 5 and represents [(valence of M)–2], and r represents an integer of 0 to 3.

5. The aqueous dispersion according to claim 1, wherein the hydrophilic group is a substituent selected from the group consisting of an acid anhydride residue, a carboxyl group, a hydroxyl group, an amide group, an amino group, a pyridyl group and a group having a polyalkylene glycol structure.

6. The aqueous dispersion according to claim 1, wherein the monomer unit having a hydrophilic group in a main chain of the graft copolymer originates in at least one monomer selected from the group consisting of [I] acrylic acid and derivatives thereof, [II] methacrylic acid and derivatives thereof and [III] vinyl esters and derivatives thereof.

7. The aqueous dispersion according to claim 1, wherein the monomer unit having a hydrophilic group in the main chain of the graft copolymer is at least one monomer from the following A group and at least one monomer from the following B group:
    wherein the A group is selected from the group consisting of [V] maleic anhydride and substitution products thereof, [VI] maleic acid and esters thereof and [VII] maleimide and substitution products thereof, and
    wherein the B group is selected from the group consisting of [I] acrylic acid and derivatives thereof, [II] methacrylic acid and derivatives thereof and [III] vinyl esters and derivatives thereof.

8. A coating agent, a coating material, an ink or an adhesive comprising the aqueous dispersion according to claim 1.

9. A laminated matter having a resin layer formed by coating the aqueous dispersion according to claim 1 on a base material.

10. The laminated matter according to claim 9, wherein the base material is selected from the group consisting of a resin, a metal, a ceramic, a wood and a glass.

11. The laminated matter according to claim 9, wherein the base material is selected from the group consisting of a crystalline polypropylene, a crystalline block polypropylene and a crystalline propylene random copolymer.

12. The aqueous dispersion according to claim 1, wherein the homopolymerization chains are directly bonded to the main chain of graft copolymer.

13. The aqueous dispersion according to claim 12, wherein the homopolymerization chains are propylene homopolymers.

14. The aqueous dispersion according to claim 12, wherein the main chain consists of polymerized units of acrylic acid.

15. The aqueous dispersion according to claim 12, wherein the main chain comprises polymerized units of acrylic acid and at least one of polypropylene glycol monoacrylate and polyethylene glycol monoacrylate.

* * * * *